Dec. 14, 1965   C. W. ZIES   3,222,797
METHODS FOR THE REMOVAL OF MOISTURE FROM POLYMERIC MATERIALS
Filed Feb. 9, 1965   9 Sheets-Sheet 1

INVENTOR.
CARL W. ZIES
BY
Meyer Baldwin, Doran & Egan
ATTORNEYS

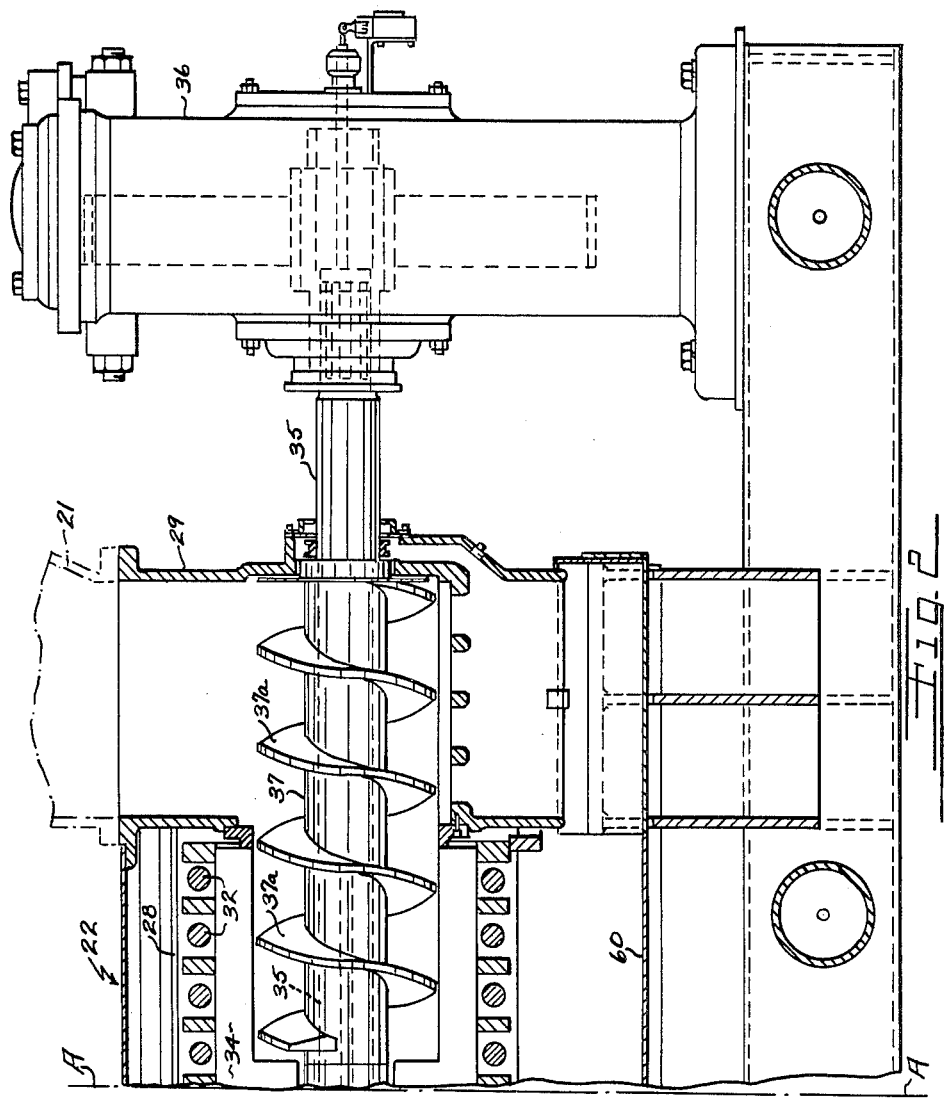

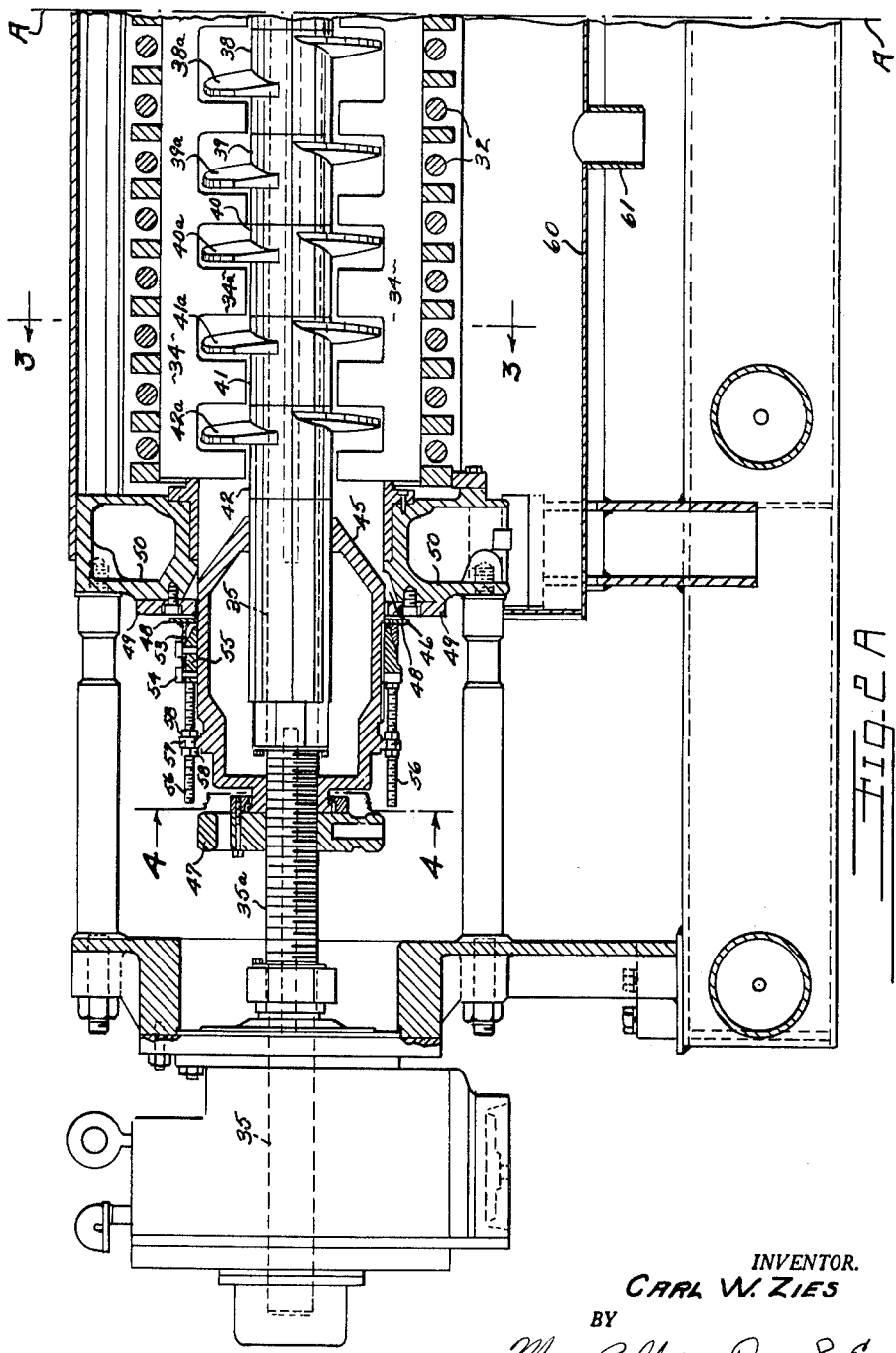

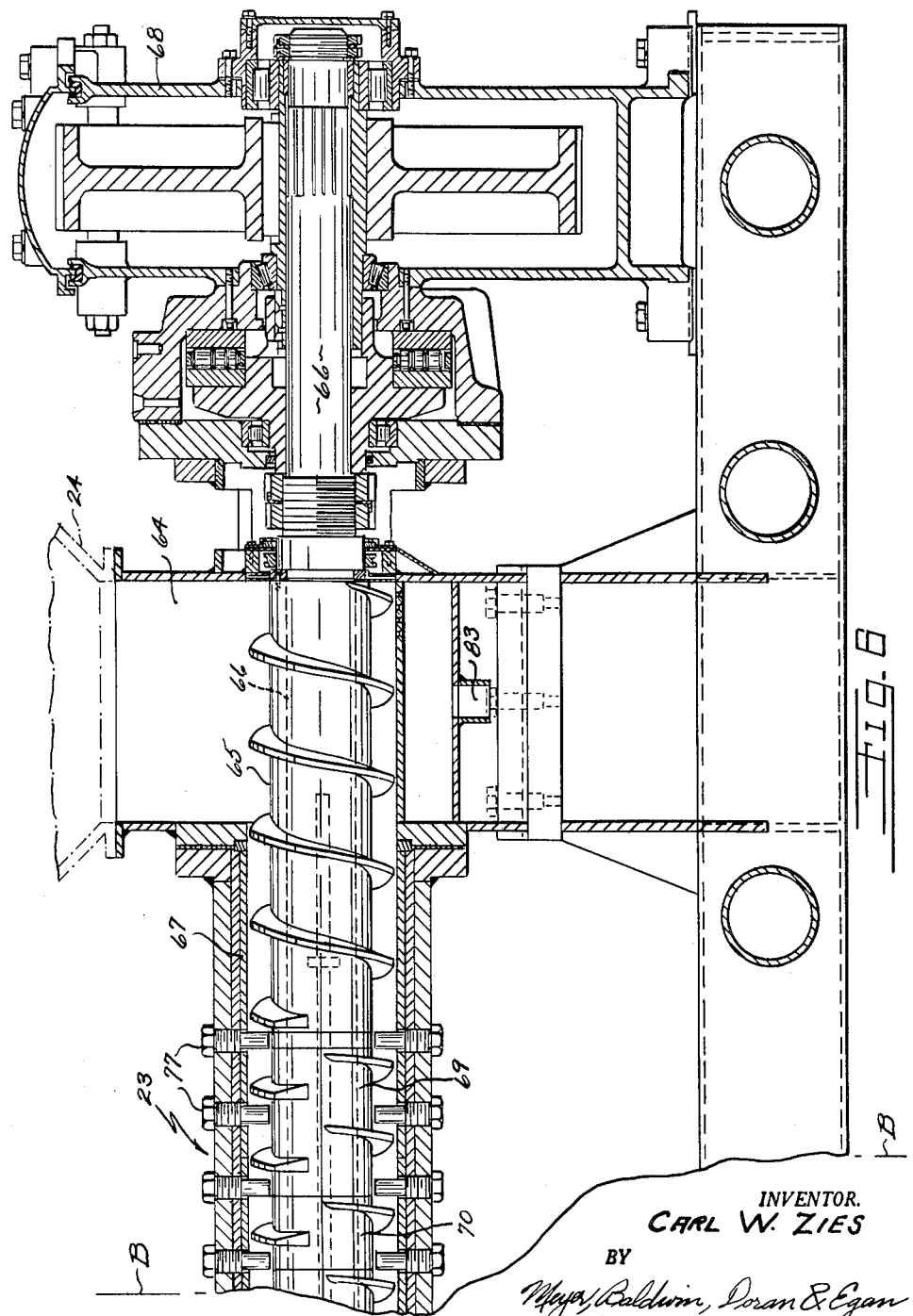

Dec. 14, 1965 C. W. ZIES 3,222,797
METHODS FOR THE REMOVAL OF MOISTURE FROM POLYMERIC MATERIALS
Filed Feb. 9, 1965 9 Sheets-Sheet 6
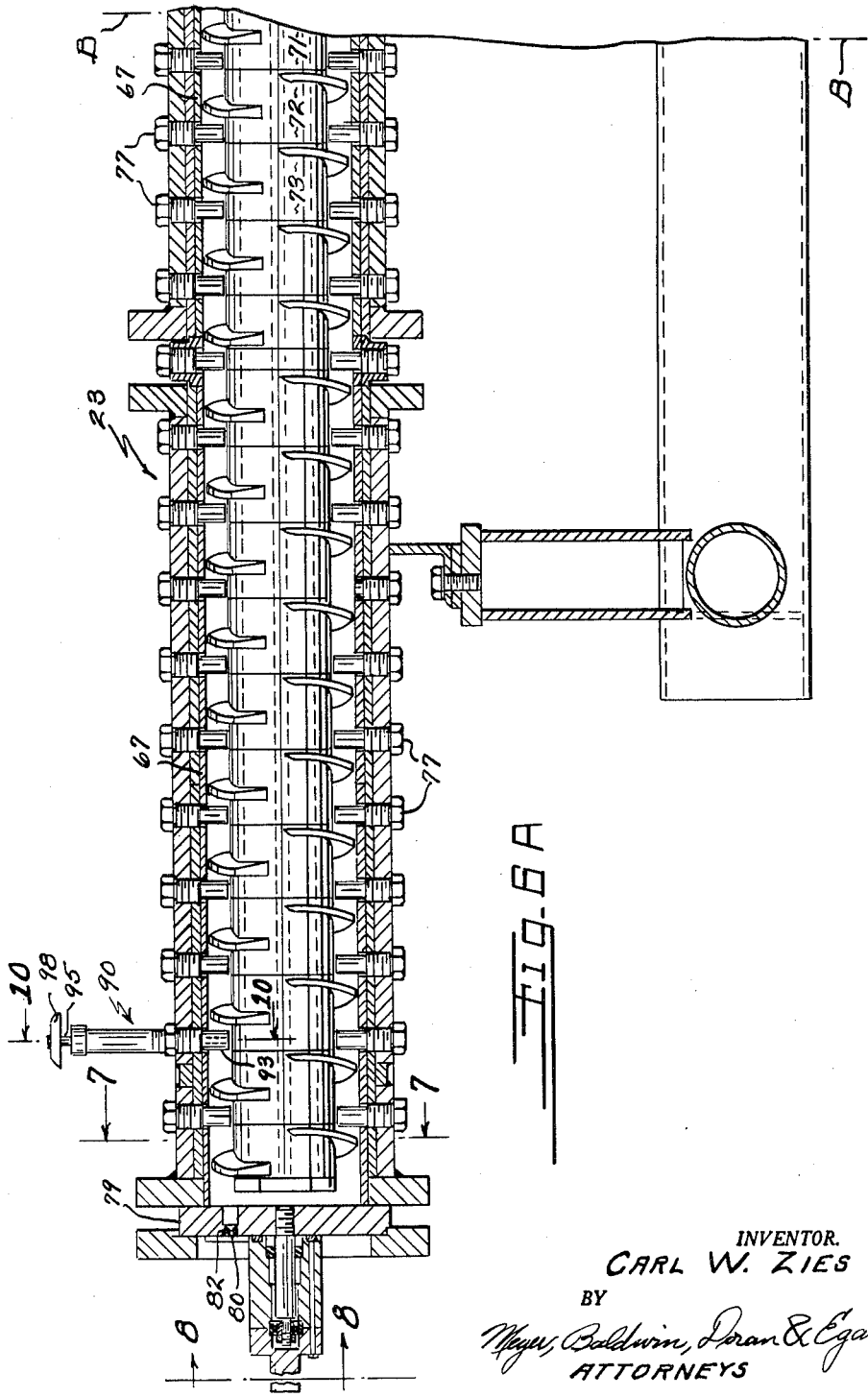
INVENTOR.
CARL W. ZIES
BY
Meyer, Baldwin, Doran & Egan
ATTORNEYS Dec. 14, 1965 C. W. ZIES 3,222,797
METHODS FOR THE REMOVAL OF MOISTURE FROM POLYMERIC MATERIALS
Filed Feb. 9, 1965 9 Sheets-Sheet 7
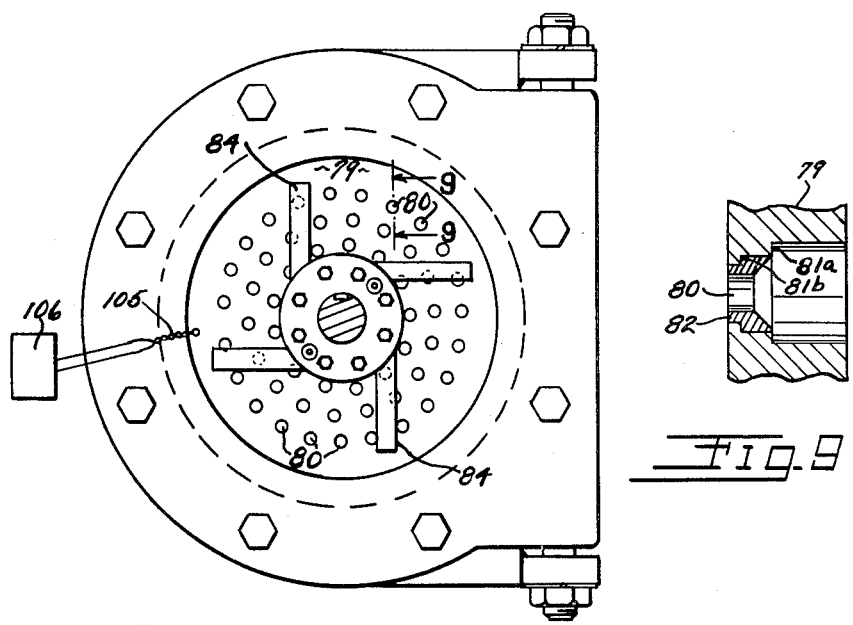
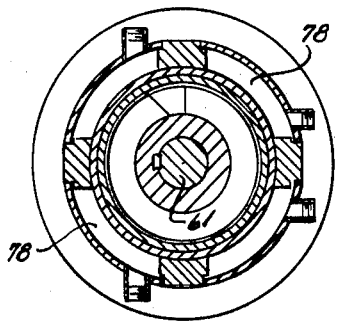
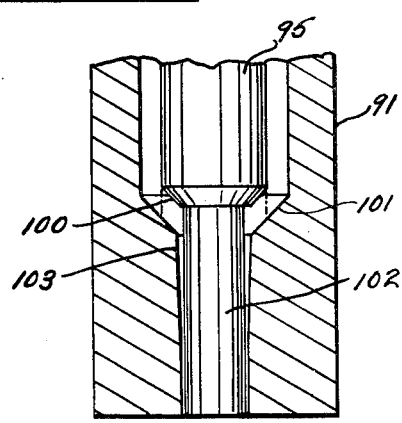
INVENTOR.
CARL W. ZIES
BY
Meyer, Baldwin, Doran & Egan
ATTORNEYS United States Patent Office 3,222,797
Patented Dec. 14, 1965

3,222,797
METHODS FOR THE REMOVAL OF MOISTURE
FROM POLYMERIC MATERIALS
Carl W. Zies, Lakewood, Ohio, assignor to International
Basic Economy Corporation, New York, N.Y., a corporation of New York
Filed Feb. 9, 1965, Ser. No. 431,389
17 Claims. (Cl. 34—17)

The present invention is a continuation-in-part of my co-pending application, Serial No. 275,592, filed April 25, 1963, now abandoned, which is a continuation-in-part of Serial No. 89,973 filed February 17, 1961, now abandoned.

This invention relates to methods for the preliminary deliquifying and finish drying of natural, synthetic and reclaim rubbers, polyethylene, polypropylene, and other polymeric materials as hereinafter defined. More specifically, this invention relates to methods for preliminary deliquifying of such materials in a continuous manner, followed by means and methods for continuously raising the temperature of those materials and the retained liquid to a degree such that the sensible heat of the materials provides sufficient B.t.u.'s for the instantaneous evaporation of a substantial part of the liquid contained therein under conditions of atmospheric or sub-atmospheric flash evaporation and flash evaporative cooling.

During the second world war, a number of plants were built to produce and process a copolymer of butadiene and styrene. This copolymer at that time was named GRS rubber and is now more commonly called SBR rubber. Polymerization is conducted in an emulsion of the raw materials in water. Upon completion of the polymerization reaction, the non-reacted butadiene and styrene are stripped from the emulsion of rubber in water. Subsequently an acid or an acid salt is added to the emulsion to coagulate the rubber contained therein into a form which, in the trade, is termed "crumb."

The more specialized rubbers, which have been developed in recent years, for example Butyl rubber and polybutadiene rubber, are produced by a polymerization in the presence of an organic solvent. Upon completion of the polymerization, the organic solvents are also stripped from the rubber material. Although this stripping is conducted in several different ways, most of these ways result in the employment of water as the carrier for the rubber.

As a consequence of the methods by which various raw materials are polymerized, and because of the means of removing the unreacted components and/or solvents from these materials, most such polymers finally occur as a water slurry. Since the end use of such polymers requires the elimination of water and volatile solvents in general, these fluids must be substantially completely removed from the polymer materials.

The most common procedure heretofore used consists of removing the free water by means of a vacuum rotary drum filter, or rubber rolls. These items of equipment will reduce the moisture content of various polymers to values in the range of 25–55%. The polymeric materials, thus freed of the readily removable water, are passed through a shredder and blown to hot air apron dryers. In these dryers, of course, the hot air vaporizes the water contained in the polymeric crumb particles and increases the temperature of these particles to values in the range of 200 degrees F., and finally in the last stages of drying, to 220 degrees F. to 250 degrees F. The relatively long time that the polymers are subjected to the relatively high temperatures is detrimental to the polymer quality. The capital investment for such units is excessive, floor space required is considerable, and the cost of maintenance of such units is high.

After the preliminary dewatering step referred to above, the polymer may also be dried in large batch mixers some of which are commercially known in the trade as Banbury Mixers. These units may take charges of 400 pounds per batch. By driving the agitator elements with electric motors of approximately 1500 H.P. the polymer, under the friction of agitation, is raised in temperature to 300 to 400 degrees F. During this time moisture vapors may be bled from the mixer, but at the end of the cycle the polymer is literally blown from the mixer to permit the escape of moisture. These units, likewise, require high capital investment and have all the limitations associated with batch operation. In addition, auxiliary items of equipment, generally including a shredder and a pelletizer, are required to reduce the thus dried rubber to packageable form.

A more recent method of drying polymeric compounds consists of preliminarily dewatering the materials as described above and then continuously feeding them to a continuous helix apparatus in which the housing of the apparatus may be steam jacketed. These machines are operated on the principles of converting electrical energy to heat energy for raising the temperature of the polymer and the water contained therein. Upon reaching a temperature of 250–500 degrees F., moisture vapor escape means are provided within the apparatus, so that the heating of the rubber continues simultaneously with and after the escape of moisture vapor. Different machines of this type known to the art provide respectively one, two or three such moisture vapor escape means. As a consequence the control of the temperature of the polymer in its passage through the machine is difficult. Overheating of the polymer occurs as a result of its continued heating during and after the escape of moisture vapor. Likewise, as a result of permitting the moisture vapor to escape from the polymer, the heat transfer rate of the machine is relatively low. Finally, when the polymer does issue from the apparatus at temperatures of 300 degrees F. or higher, there is no conveniently effective means of cooling this rubber to prevent decomposition thereof.

In prior art mechanical means of drying polymers, the polymeric material is raised to a drying temperature which is normally above 220 to 250 degrees F. in the first section of the drying means. Vent sections are then provided in the apparatus so that the moisture vapor may be removed from the apparatus. These vent sections may be up to two feet in length and may be from one to three in number. Towards the end of the vapor removal area the polymer, at elevated temperature, is exposed to the oxidative degradation effect of air. Also in apparatus of this type considerable trouble is encountered in preventing the vapor vents from clogging with polymer. In the means of carrying out this invention, the large portion of air is pressed from the polymer in the feed worm section 67 (FIG. 6) of the drying apparatus. Since no vapor escape means are provided, the polymer is not in contact with air during its rapid heating to elevated temperatures. In fact, the polymer is protected by surface moisture in its passage through the drying apparatus. As a result the possibility of oxidative degradation by the presence of air at elevated temperatures is eliminated.

In the present specification, and the appended claims, the terms "dewatering" or "deliquifying" are used to denote the preliminary elimination of readily removable water or other liquid down to between five percent and twenty percent, and the term "drying" is used to denote the substantially complete removal of liquids, for example to less than one-half of one percent.

An object of this invention is to provide efficient means and methods for preliminary deliquifying of polymeric materials.

Another object of this invention is to provide such means and methods for deliquifying of polymeric materials so that the deliquified polymer may more efficiently be dried in hot air apron dryers.

Another object of this invention is to provide means and methods of preliminary deliquifying of polymeric materials so that the deliquified materials may be immediately processed in mechanical dryers.

Another object of this invention is to provide means and methods for drying of polymeric materials at relatively low and controlled temperatures.

Another object of this invention is to provide means and methods for the drying of polymeric materials so that instantaneous flash evaporative cooling permits an instantaneous temperature reduction of the polymer after it is discharged from the drying apparatus.

Another object of this invention is to provide means and methods for the drying of polymeric materials under conditions such that the time at which the polymer is exposed to drying temperatures is reduced to a minimum.

A further object of this invention is to provide means and methods for the drying of polymeric materials to improve the quality of those polymers.

A further object of this invention is to provide means and methods for deliquifying and drying of polymeric materials, such means requiring less floor space than those means previously known to the art.

A further object of this invention is to provide means and methods for the deliquifying of polymeric materials under such conditions that a control of particle sizes of the deliquified polymer is made possible.

A further object of this invention is to provide means and methods for the drying of rubber under such conditions that the rubber issuing from the drying apparatus is in particle form, a characteristic desirable to permit further processing.

A further object of this invention is to provide means and methods for deliquifying and drying of polymeric continuous manner, which permits a simultaneous but controlled violent mastication of the polymer during the drying process.

A further object of this invention is to provide means and methods for the drying of polymeric materials in a continuous manner, which methods and means permit the exclusion of air from the polymeric material during the heating time in the enclosure.

Other objects and advantages of the invention will be apparent from a study of the following specification, in conjunction with the accompanying drawings, in which:

FIG. 2 is a view, partly in vertical section and partly in side elevation, and somewhat enlarged, showing the right end of the upper or deliquifying unit of FIG. 1.

Figure 1:
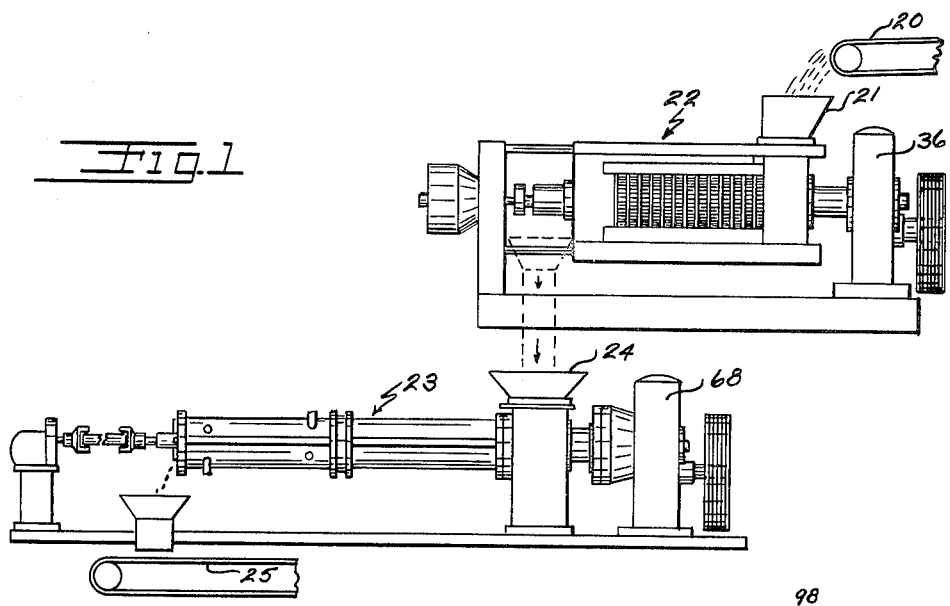
FIG. 1 is a side elevational view of several main features of a combined deliquifying and drying assembly for use in the operation of the present invention.

FIG. 2A is a view similar to FIG. 2 but showing the left end of the upper or deliquifying unit of FIG. 1. The lines A—A on FIGS. 2 and 2A indicate the arbitrary separation plane on which the drawings 2 and 2A may be matched to show the complete unit. The line 2A on FIG. 5 shows the position of the section for FIG. 2A.

Figure 4:
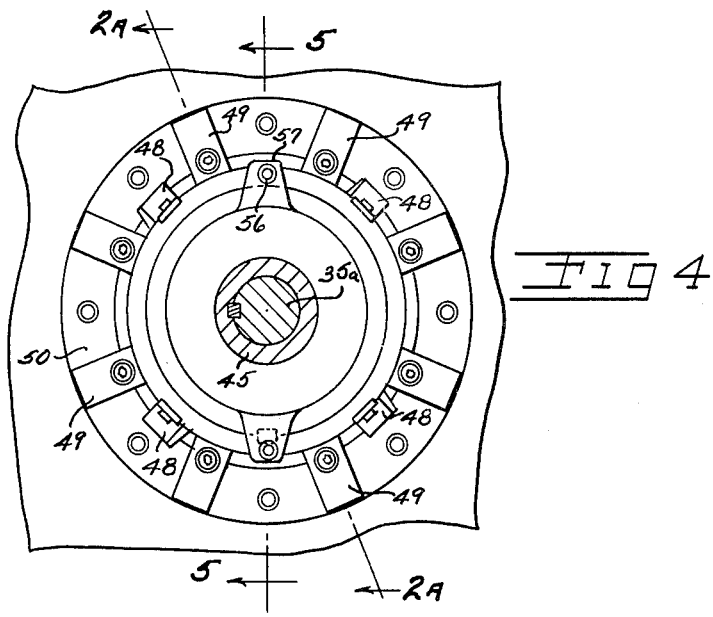

FIGS. 3 and 4 are sectional views taken respectively on the lines 3—3 and 4—4 of FIG. 2A.

Figure 5:
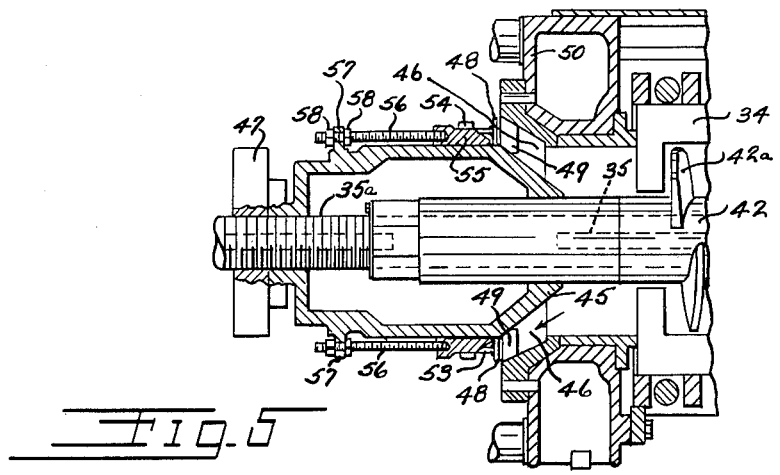

FIG. 5 is a sectional view taken on the line 5—5 of FIG. 4.

FIG. 6 is a view, mainly in longitudinal vertical section, and somewhat enlarged, showing the right end of the lower or drying unit of FIG. 1.

FIG. 6A is a view, similar to FIG. 6 but showing the left end of the drying unit. The line B—B on FIGS. 6 and 6A indicates the arbitrary division plane of the two portions on which FIGS. 6 and 6A may be matched to show the complete drying unit.

Figures 8, 10:
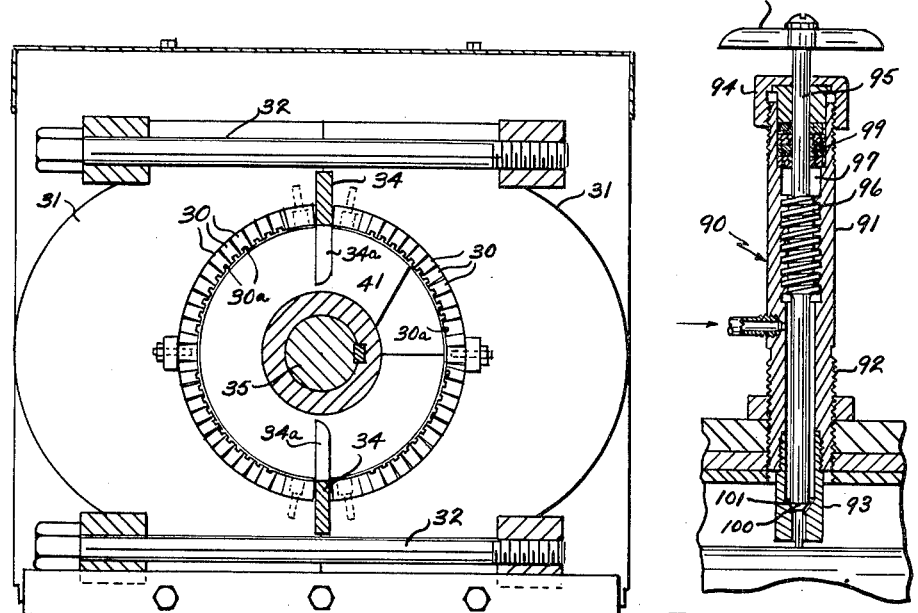

FIGS. 7 and 8 are respective sectional views taken on the lines 7—7 and 8—8 of FIG. 6A.

FIG. 9 is a fragmentary sectional view taken on the line 9—9 of FIG. 8, and somewhat enlarged.

FIG. 10 is a vertical sectional view, taken on the line 10—10 of FIG. 6, and somewhat enlarged, the valve being closed.

FIG. 11 is a view of a fragmentary portion of the tip of the valve shown in FIG. 10, the valve being partially open.

Figure 12:
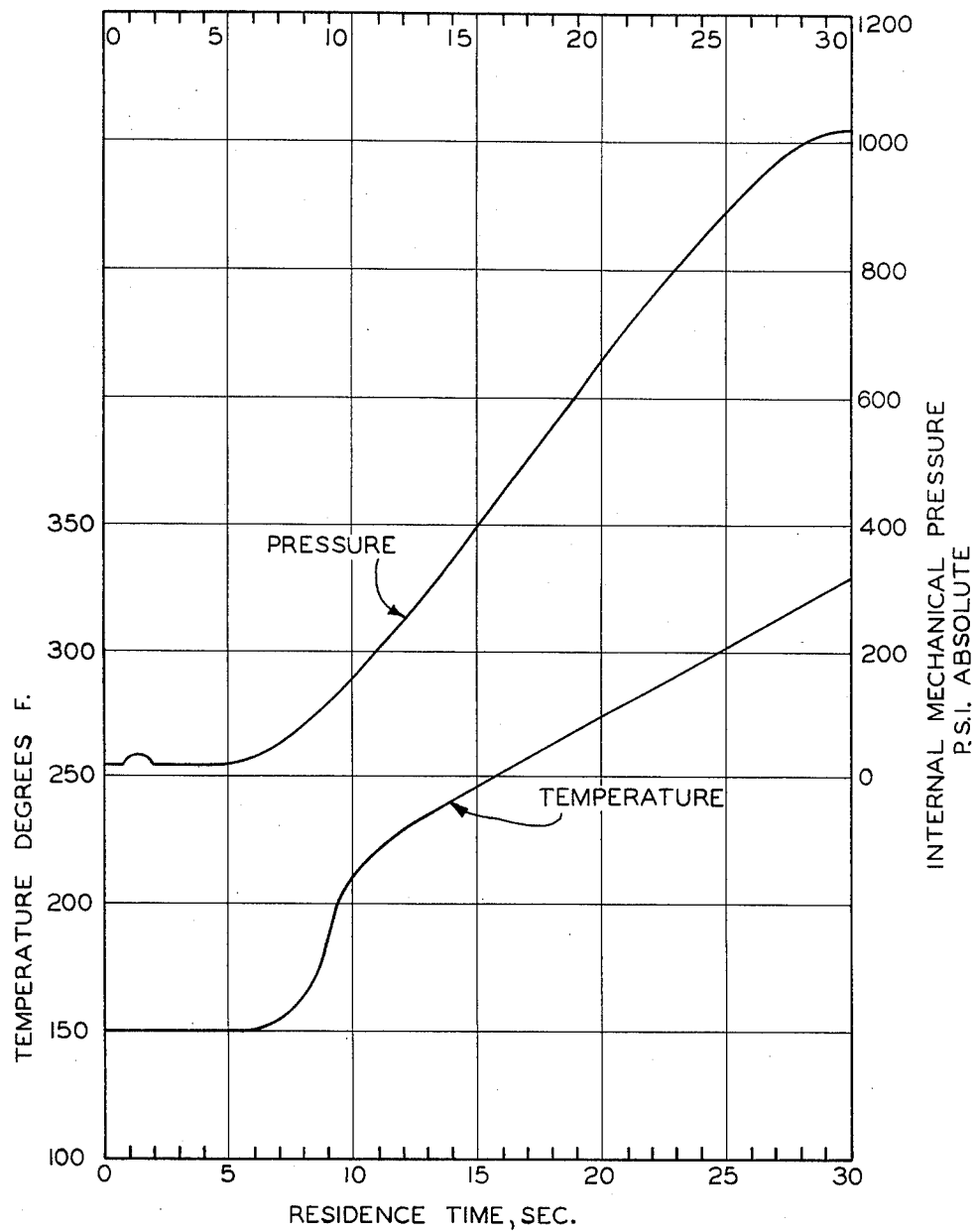

FIG. 12 is a graph showing the relationship between temperature, pressure, and elapsed time in seconds within the barrel of the drying unit of the present invention.

Figure 13:
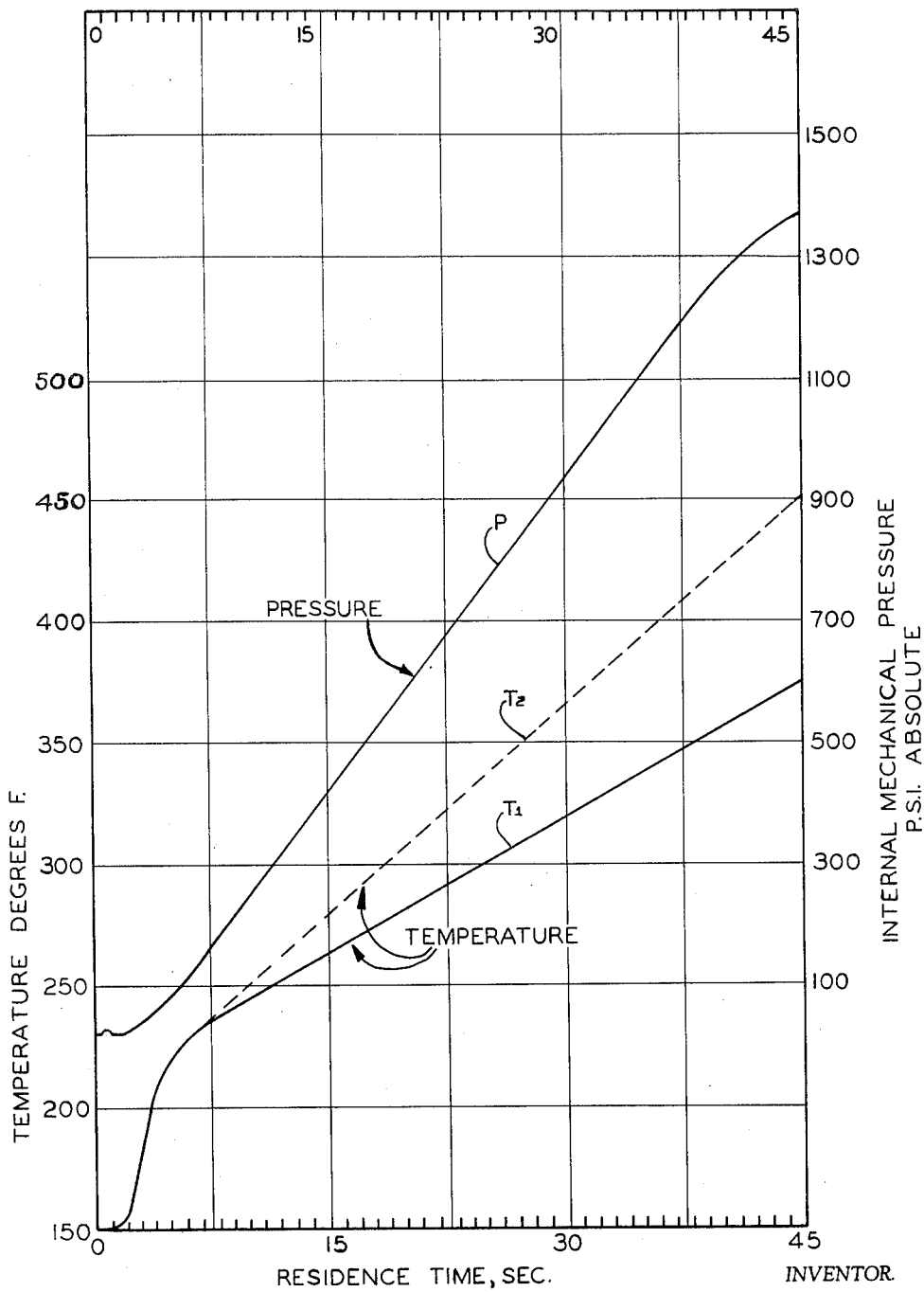

FIG. 13 is a view similar to FIG. 12 but showing temperature, pressure, and time relationships for drying several other polymeric materials.

Referring first to FIG. 1, I show in simplified outline an apparatus for deliquifying and drying a slurried mixture of a polymer in liquid. The slurry is discharged from the upper right of the drawing, either from a conveyor 20, or from any suitable chute or pipe, into a receiving hopper 21 of the first, or deliquifying, unit 22. So-called "free" liquid, namely gravity-drainage liquid, in excess of about fifty percent, may be permitted to escape before the material enters the hopper. Removal of free-flowing liquid can be accomplished by passing the polymer-liquid slurry over an inclined perforate screen or over a vibrating screen. The polymer continually advances through unit 22, during which advance a substantial amount of retained liquid is forcibly expressed. In this first or deliquifying stage the liquid is reduced to between five percent and twenty percent by weight, depending on the particular composition and physical characteristics of the polymer and liquid.

If the second unit 23, of the FIG. 1 assembly is to be used for drying the deliquified polymer, said elastomer after discharge from unit 22 may be fed to a hopper 24 and advanced through the unit 23 from whence, in dried form, with its liquid content reduced to a small fraction of one percent, the polymer is removed on a conveyor 25 or otherwise.

It is to be understood that while each of the units 22 and 23 may be used separately, in conjunction with either new or previously known other apparatus and processes, the most advisable procedure, from the standpoint of efficient and economic results, is to use the combined apparatus in the manner just indicated.

The procedure will now be outlined in greater detail, with reference to specific structural features of the respective units 22 and 23.

The deliquifying unit is shown in FIGS. 2, 2A, 3, 4 and 5. It comprises an elongated, cylindrical barrel housing or enclosure 28 opening at its right end (FIG. 2) into a feed aperture 29 which is in communication with chute 21. The barrel is built up from an assembly of barrel bars 30 best shown in section in FIG. 3, held together by semicircular split ring retainers 31, clamped in tight engagements by large clamping bolts 32. Protruding into the barrel at spaced locations, and here shown as diametrically opposed, are knife bars 34 which have a purpose to be indicated hereinbelow. The barrel bars are slightly spaced, for example by spacer clips (not shown) to provide escape interstices through which liquid can be forced, but not wide enough to permit escape of solid particles.

Axially within the barrel is a rotatable shaft 35 driven from power driving and gear reduction means (not shown) the gear reduction means being within housing 36. Conventional journalling means including bearings and suitable packing are provided within housing 36 (FIG 2). Similar journalling means are provided for the other end of the shaft, but being conventional they are not shown in detail. It is sufficient to state that the shaft may be rotated, and its speed controlled, to suit the requirements of the present process.

Carried on hubs or sleeves, 37, 38, 39, 40, etc., are a succession of respective screw flights 37a, 38a, 39a, 40a, etc. Screw fight 37a constitutes a feed worm which receives material from feed aperture 29 and advances it to the left (FIG. 2) into the barrel. The feed worm is of constant pitch along its length and produces only a limited amount of compaction of the polymer although there is a certain amount of resistance to advance caused by the restriction nature of succeeding compression worms (flights 38a, 39a, 40a etc.) and the knife bar tips 34a which project inwardly between flights. The peripheral edge of the left end of the feed worm 37 has operating clearance, but no more, from the inner peripheral faces of the barrel bars 30.

The continuous feed worm flight 37a advances the wet polymeric material to the left where it is taken up by the successive interrupted flights 38a, 39a, 40a, 41a, and 42a. These flights also have close working clearance from the inner barrel periphery and a knife bar tip projects inwardly between each adjacent pair of flights. Proceeding towards the left end of the shaft, each flight decreases in pitch from the preceding flight so as to steadily increase the compression exerted on the polymeric material.

At the discharge end of the deliquifying unit, which is towards the left of FIG. 2A, there is an adjustable cone choke 45 which can be advanced or retracted along the shaft 35 to increase or decrease the escape area 46 (FIGS. 2A and 5) through which the deliquified polymer is finally extruded. The shaft is threaded at 35a to receive a backing nut 47 which holds the cone at any selected position against the pressure of issuing material. Obviously, as the opening 46 is reduced in size the back pressure on the advancing polymer is increased. The cone 45 rotates with shaft 35, and carries a circumferentially disposed series of cutter bars 48 (FIGS. 4 and 5) which rotate past and in sliding contact with a second series of cutters 49 which are fixed to the barrel discharge frame 50, as best shown in FIGS. 2A, 4 and 5. By selecting the number and spacing of the co-operating cutter members 48 and 49 the dimensions of pieces of issuing polymer can be controlled.

The cutters 48 which rotate with the cone can be moved to the left or right, FIGS. 2A and 5, so as to maintain a working relationship with the fixed cutters 49 during endwise adjustment of the cone. As shown, cutter bar 48 is carried on a tab 53 which is attached by studs 54 to a sliding piece 55, the position of the sliding piece being governed by a threaded adjusting rod 56 which passes through a tab 57 on the cone body. After endwise movement of the cutter bar 48 to the desired operating position the rod 56 is retained in that position by nuts 58. The independent adjustment of the cone obviously requires a compensating adjustment of the cutters 48.

The polymer, which may contain 50–60% liquid, is fed by feed worm 37 to pressing worms 38, 39, 40 etc. As previously noted there is some compaction of the polymer in the feed worm. Consistent with this partial compaction, there is a freeing of liquid from the polymer through the interstices between barrel bars 30, FIG. 3. These bars, as illustrated, may be spaced from .020″ to .10″ apart, as an example, by spacing clips (not shown) to permit the ready flow of water from the polymer as a result of the mild compaction of the polymer in the feed worm 37.

The remaining part of the barrel in the compression worm area of the apparatus is likewise lined with barrel bars which may be spaced from .005″ to .125″ apart. By employing compressing worms 38–42 a selected distance apart, the polymer is further compacted to force the liquid contained therein from the compacted mass and out through the barrel bar openings. This removed liquid is collected in pan 60 and is discharged through pipe 61. By adjusting cone discharge mechanism 45 a greater or lesser compaction of the polymer may be accomplished over and above that imposed by the compaction of the worm arrangement employed. By rotating the cone discharge arrangement 45, which is secured to the driving shaft and correspondingly rotating cutter elements 48 (FIG. 5) relatively thin wafers of deliquified polymer issue from the apparatus.

It has been discovered that a certain combination of arrangement of the apparatus of this invention permits an increased effectiveness of the liquid removal process and an increased efficiency of use of horsepower. In the processing of polymeric materials it has been found that the feed worm 37 must be carried at least one complete flight into the barrel housing. If the feed worm is not carried into the barrel housing, the polymeric materials tend to build up in the feed hopper 21 and entry port 29 and resist transfer into the compression area of the apparatus. Knife bar elements 34 are employed to prevent rotary motion of the polymer within the compression section of the apparatus. I have found, however, that the employment of grooved or milled barrel bars as shown at 30a in FIG. 3 greatly increases the volumetric efficiency of the worms. I have further found that the employment of decreasing pitch worms in the compression area of the apparatus, along with the knife bars 34 and grooved barrel bars 30, are preferable in order to compact the polymer to values in the range of 10% liquid. Then finally, I have found that the operation of the worm shaft with compression worms 38–42 at an r.p.m. so that the volumetric worm efficiency is in the range of 10–50%, causes a cutting through of the compressed polymer in the compression zone by the lead edges of compression worms 38–42 which thereby, provide briefly-opened channels through which the liquid can flow from the compressed mass to and out through the spaced barrel bars. It is obvious that various diameters and lengths of the apparatus may be employed, depending upon required capacities in different applications. It is also obvious that various forms of cutter arrangements 48 and 49 may be employed to reduce the size of the compacted and dewatered polymer to small sections. It is also obvious that various forms of an adjustable choke device may be employed to increase or decrease the escape area 46 (FIGS. 2 and 5) through which the deliquified polymer is finally extruded.

When the deliquifying apparatus of this invention is used ahead of apron dryers, it is obvious that a porous structure of the deliquified polymer, for example, rubber, is essential for the finish drying of the material by passage of hot air through a continuous moving bed of the material. It has been found, for example, that the apparatus as described above, when operated in certain ways, produces a highly compacted non-porous mass, which may require approximately two hours in an apron dryer to be reduced to less than .5% moisture. I have found, however, that by operating the deliquifying apparatus of this invention at a shaft r.p.m. so that the worm efficiency is maintained in the range preferably of 10 to 20%, but permissible in the range of 5 to 30% with a certain selection of worm arrangements, a porous structure of the dewatered rubber results. For example, a mass of free drained rubber crumb has many non-rubber voids within the mass structure. These non-rubber voids referred to are those voids between rubber crumb particles and not the capillary structure of the crumb particle itself.

By selecting a worm arrangement so that the first compression worm after the feed worm brings about a mild compaction of the full volume of rubber crumb continuously being fed to the press, these non-rubber voids are to a considerable degree sealed within this slightly compacted rubber crumb mass. By the continued application of pressure on this rubber crumb mass as it is advanced down the length of the dewatering apparatus, water is expressed from the mass. At the preferred worm efficiencies these non-rubber voids are drawn throughout the mass into capillary or macro-capillary structures. Thus when the dewatered mass leaves the press it has a porous structure that lends itself to the evaporation of water within relatively short periods of time.

Polymers dewatered in the apparatus as described above may be shredded in standard rubber shredders or, in the form as issuing from the apparatus, blown to hot air aron dryers so as to thus increase the capacity of apron dryers used in the art by as much as 50 to 100 percent.

The apparatus of this invention permits the reduction of water content of various polymers to 5–20% moisture content in contrast with the 25–55% in those units known to the art. This preliminary reduction in moisture content in itself increases the capacity of subsequent thermal apron dryers. In addition, the use of a rotating cone discharge element in combination with a polymer cutting device maintains and does not destroy the porous structure of the compressed polymer as it issues from the apparatus. As a consequence, this open structure permits an efficient transfer of heat throughout the polymer mass in the apron drying equipment thus increasing the efficiency of the unit.

As an example, a standard synthetic rubber apron dryer had an operating capacity of 2514 pounds per hour. By the installation of a dewatering apparatus according to this invention ahead of the dryer, an average capacity over a several months period of time of 5040 pounds per hour was possible. Since the installed cost of the apparatus of this invention would be ¼ or ⅕ of the installed cost of the apron dryer in this example, the economics of the use of the apparatus of this invention ahead of an apron dryer are obvious.

I now proceed to a description of the drying unit of the apparatus, generally indicated by reference numeral 23 in FIG. 1, and shown in detail in FIGS. 4 to 10 inclusive.

The dryer includes a feed hopper 24 communicating with an entry port or aperture 64. Deliquified material is advanced by a feed worm 65, on a shaft 66, into a barrel 67. The shaft is rotatable by motor means (not shown) through a gear reduction unit 68. Conventional bearings and packing are provided at the feed end of the shaft. The shaft rotates axially within barrel 67, which is imperforate.

As in the deliquifying unit, the drying unit shaft carries a succession of compression worms 69, 70, 71, 72, 73, etc. Between each individual screw flight are inwardly extending breaker bolts 77 which serve approximately the same function as the knife bars 34 in the deliquifying unit. The barrel is preferably provided with steam jacket chambers 78 (FIG. 7). At the left left end of the barrel is a discharge mechanism to be more fully described hereinbelow but including a die plate 79 provided with discharge apertures 80 (FIGS. 6A, 8 and 9).

As best seen in section in the enlarged view, FIG. 9, the die plate 79 is bored to provide a reduced exit aperture having shoulders 81a and 81b which serve to retain a die insert 82. By this means dies of different aperture diameters, shapes, and forms, may be substituted.

In operation of this apparatus, deliquified polymer fed directly from the deliquifying apparatus described above, continuously flows to feed hopper 24, and through port 64 into feed worm 65. The polymer is slightly compressed in this feed worm and fed across the first breaker bolt area into compaction worms 69, 70 etc. The pitch of the first compaction worm 69 is preferably less than the pitch of the feed worm 65. The first compaction worm 69 further compresses the polymer by forcing it across the second breaker bolt area into compaction worm 70. Compaction worm 70 again further compresses the polymer by forcing it across the next breaker bolt area into reduced pitch compaction worm 71. During this stage of operation, the polymer is exposed to the heated wall of the housing of the apparatus. For most polymers it is preferable that the steam jacket about the housing be heated with steam at 200–250 pounds per square inch pressure. For certain polymers, lower or higher pressures may be employed. Not only are the polymers heated in the first elements of the press by means of the steam jacket, but also by the rotation of the compaction worms through the polymer mass. The apparatus is preferably operated and the pitch of the compaction worms with the breaker bolts are preferably designed, so that the mechanical pressure built up and imposed upon the polymer is always greater than the vapor pressure of the liquid contained in the polymer so as to maintain the liquid in liquid form. In consequence of this, as the polymer increases in temperature above the boiling point of the liquid, sufficient compression is built up by the apparatus on the polymer that no appreciable escape of liquid as vapor occurs throughout the compaction section of the apparatus.

As a safety feature, designed into the unit, the section of the apparatus immediately under feed opening 64, as shown in FIG. 6 contains a perforated section 83. The combination of the deliquifying apparatus and the drying apparatus working together is normally predicated on the assumption that the deliquifying apparatus will reduce the moisture content of the elastomer to values in the range of 5–20 percent. At these moisture values, sufficient compaction pressure on the polymer within the drying apparatus may be imposed to prevent flashing of the liquid contained therein at the temperatures of the drying operation. If the liquid content of the polymer being continuously fed to the drying apparatus is for any reason higher than approximately 20 percent, the first compaction worms will tend to free liquid from the polymer being compacted. This liquid may then flow in a contrary direction to the polymer and exit from the dryer through the perforate section 83. This is not an ordinary mode of operation, but the drainage area in the dryer is provided to take care of the eventuality of improper procedures in equipment or processes in the line prior to the dryer.

The polymer is transferred through the drying apparatus by the several remaining compaction worms in such manner that the temperature of the polymer and the liquid contained therein is constantly being increased. Simultaneously the mechanical pressure impressed upon the polymer, and upon the liquid contained therein, is increased and maintained to a degree in excess of the vapor pressure of the liquid at increasing temperatures during passage throughout the apparatus.

By rotating the compaction worms at a relatively high speed, for example between 100 and 300 r.p.m. so that they are operating at a volumetric worm efficiency preferably in the range of 10–25%, but permissibly in the range of 5–40%, electrical energy may be translated into thermal energy thus providing heat to the polymer and the liquid contained therein. Not only does the relatively high r.p.m. of the worm flights permit a rapid heating of the polymer, this relatively high r.p.m. also makes possible a violet mastication or agitation of the elastomer during passage through the apparatus. By use of the several breaker bolts 77 which may be in a 2, 4, or even 6 segments of the barrel, the polymer is prevented from rotating with the shaft, thus further increasing the relative motion of the polymer with respect to the several compaction worms, thus increasing the heat transfer efficiency.

By the above means and methods the temperature of the polymer and the liquid contained therein is brought to a maximum just ahead of the discharge die plate element 79. The polymer with its associated liquid content then issues through the die apertures of die plate 79 at a condition wherein the temperature of the associated liquid is considerably above the boiling point of the liquid, but at a pressure such that the liquid is still in the liquid state.

Upon issuing from the die openings to atmospheric pressure or sub-atmospheric pressure we have found that a portion of the liquid in the polymer-liquid system is forcibly ejected from the polymer in small droplet form. We have further found that at the discharge temperatures and differential pressures employed in the practice of this invention the amount of liquid remaining with the polymer is in the range of ten percent or less. The specific amount of liquid remaining with the polymer is a function of the differential pressure but more specifically of the polymer and liquid themselves. Further under the aforesaid conditions of temperature and pressure employed in the practice of this invention, there are sufficient B.t.u.'s in the polymer and the residual liquid to cause instantaneous flashing of substantially all of this liquid to vapor from the polymer. In this instantaneous conversion of liquid to vapor, there is an instantaneous cooling of the polymer as a result of the liquid and polymer giving up sensible heat to vaporize the liquid. In addition the escape of the vaporized liquid from the polymer causes an expansion of the polymer to a porous structure, which permits the continued evaporation of liquid until the moisture content of the polymer is substantially completely removed.

The polymer, upon issuing from apertures 80 in the die plate may be cut by cutters 84 (FIG. 8) into sections as small as 0.01" to 0.125" in thickness. The dimensions of these sections, of course, are controlled ultimately by the number of cutters employed and/or the r.p.m. of the cutter mechanism, as well as by the die apertures. The very small sections or slices of the extruded pieces also permits the instantaneous escape of vapor from the material.

I have found that by maintaining the liquid content of the polymer in a liquid form throughout the travel of the polymer through the apparatus, a greater overall heat transfer coefficient may be obtained in the apparatus. For example, different tests concerned with drying of different types of synthetic rubbers have indicated than an overall heat transfer coefficient of 200 B.t.u.'s per hour per degree Fahrenheit per square foot is attainable with the apparatus of this invention. This coefficient is two to three times the value that is normally encountered in mechanical uits for the drying of polymers that have relatively low specific heats.

Further, by maintaining the liquid content of the polymer in the liquid state during the temperature-raising step, the possibility of incipient over-heating of the polymer either on the inner wall of the shell of the vessel, or on the surface of the worms and shafts of the apparatus, is greatly reduced. Further, by maintaining the liquid in a liquid state and bringing the liquid and the polymer up to a final discharge temperature, the residence time of the polymer at this temperature is exceedingly short and practically immeasurable. If, as practiced with other mechanical devices for the drying of polymers, the liquid is permitted to vaporize from the polymer as it progresses through the apparatus, continued heating of the polymer occurs so that the time of the polymer at elevated temperature is appreciable, and therefore detrimental to the polymer.

In certain instances, it may be advantageous to pump a small amount of steam, inert gas, or superheated steam, into the apparatus of this invention in order to increase the porosity of the polymer issuing from the exit dies of the apparatus. It might even be advantageous to lead a certain amount of vaporized or superheated liquid into the apparatus in order to increase the total B.t.u. input into the material being processed. In order to accomplish the introduction of gas or vapors into the apparatus of this invention, a valve as indicated in FIGS. 6A, 10 and 11 may be inserted through the wall of the unit in place of any one of the breaker bolts 10. This valve unit is actually a special valve made to replace a breaker bolt. The valve stem and seat are so designed that the closure of the valve prevents any flow back of process material into the valve.

The valve 90 comprises a housing 91 having a threaded portion 92 adapted to interfit one of the threaded apertures such as are occupied by breaker bolts 77. Housing 91 also has a nonthreaded portion 93 which extends inwardly beyond the inner periphery of the barrel.

The housing 91 is hollow and is provided at the outwardly directed end thereof with a thread fitted cap 94. A valve stem 95 is mounted concentrically within the housing 91, said stem having an intermediate threaded portion 96 thread fitted within a bore 97 of said housing. The valve stem projects outwardly from the threaded portion 96 through a suitable aperture in the cap 94 and is provided at its outermost end with a handle 98. Packing 99 is compressed under the cap 94 whereby the stem 95 is sealed in relation to the bore 97.

The valve stem 95 is diametrically reduced at its inwardly directed portion and is provided at the end thereof with a frusto-conical valve closure member 100 which has a complementary interfit with the frusto-conical valve seat 101 (FIG. 11). A small, cylindrical plunger 102 extends coaxially inwardly from the valve closure member 100 and closely interfits a small, cylindrical bore 103 in the innermost end of the housing 91. The interfit between the small piston 102 and the bore 103 is preferably such that when the valve closure 100 is unseated by turning the handle 98, pressurized vapor may be forced past the piston 102 to enter into the barrel 67 but whereby the material being processed cannot easily enter the housing 91.

Various types of rubberlike materials such as synthetic rubbers, natural rubbers, re-claimed rubbers, polyethylenes, polypropylenes, high styrene butadiene copolymers, trans-4 polybutadiene and other polymeric materials have been dried in the apparatus of this invention by the process disclosed. The words "polymeric materials" have been used throughout to describe the materials that may be dried by the means of this invention. As another means of describing such materials, the methods and means of this invention are applicable to polymers generally considered to be elastomeric, which could be exemplified by the materials referred to as rubber, by the polymeric materials that are thermoplastic; for example the polyolefins and certain of the polyaromatics; for example, polystyrene and those polymers that by the addition of inhibitors or accelerators behave as thermoplastic materials at temperatures generally above 150–200 degrees F.

As an example of the operation of the present invention it has been demonstrated that a specific synthetic rubber dewatered to 8.0 percent may be dried at the rate of approximately 5000 pounds per hour utilizing 265 H.P. with the rubber discharge temperature of 265 degrees F. Upon instantaneous evaporation of water from the polymer, and flash cooling of the polymer upon leaving the die openings of the apparatus, the temperature of the polymer was in the range of 220 to 230 degrees F. Mechanical dryers of somewhat the same volumetric displacement, which are known to the art, when drying a similar synthetic rubber, can process 2700 pounds per hour with approximately 350 H.P. input. The temperature of the same synthetic rubber leaving the prior art mechanism is 350–500 degrees F., and no means of evaporation cooling of the rubber is possible. As a consequence expensive means must be employed to cool this synthetic rubber prior to baling in order to prevent decomposition of the polymer. The apparatus of the present invention permits drying of polymers with a lower power consumption and, therefore, a lower cost of operation. In addition, instantaneous cooling of the polymers is inherent in the apparatus of the present invention.

It is also of an economical advantage that the capital investment cost of the equipment of this apparatus is from one-half to one-fourth the capital investment cost per ton of material processed by other means known to the art.

As a further example of the methods of this invention as applied to a macromolecular polymer, 4000 pounds per hour dry basis of a "1500 Series" styrene butadiene copolymer was pumped as a 3% rubber slurry to a vibrating screen. The slurry at 100 degrees F. was gravity drained of free water to a moisture content of 62%. This material, at 100 degrees F., was conveyed to hopper 21 of the screw press 22 shown in FIG. 1, and dewatered to a moisture content of 9.1% so that each 4000 pounds per hour of dry synthetic rubber still carried with it 400 pounds per hour of water. In passage through the dewatering screw press 22 the temperature of the rubber was increased to 150 degrees F. as a result of mechanical friction.

The curves of FIG. 12 show the temperature (T) and mechanical pressure (P) profiles across one embodiment of the drying apparatus 23 (FIG. 1) of this invention, as the rubber progressed through the machine according to the above specific example with the specific copolymer and the specific throughput rate stated. From the pressure curve P it will be observed that a small mechanical pressure was imposed upon the rubber in the first part of its passage through the dryer mechanism. This small pressure increment is due to the specific design of the feed worm that forms a compaction of rubber and, therefore, a mild vapor seal just after the rubber has entered the barrel 23 of the drying mechanism as shown in FIG. 6. This agglomeration of rubber was then conveyed under no substantial mechanical pressure until it reached a point about two-fifths (⅖) of the length down the barrel of the drying apparatus. At this point, after about eight seconds in the barrel 23, the rubber began to be compacted and mechanical pressures were imposed upon the rubber in increasing increments by the helical screw flights so that just at the die plate discharge, (79, FIG. 6A) the mechanical pressure reached 1015 pounds p.s.i. absolute, as shown at the right vertical edge of FIG. 12, curve P. The temperature of the rubber and water remained constant down the length of the barrel until they reached the rubber compacting zone, beginning about the eight-second point, or two-fifths (⅖) way down the barrel, FIG. 1, curve T. The temperature then increased rather rapidly over the next several seconds and then increased at a uniform rate up to the die plate at the thirtieth second, where it attained a temperature of 330 degrees F. Just at the die plate, therefor, the rubber and water mixture was at 330 degrees F. Since there was an internal mechanical pressure of about 1015 pounds p.s.i. absolute, the water was maintained in the liquid form. Upon discharging through the die plate the steam pressure of the water, which was 103 p.s.i. absolute, dropped immediately to atmosphere pressure of 14.7 pounds absolute. This instantaneous drop in pressure caused an instantaneous evaporation or flashing of the water to the vapor stage. In order to remove this water vapor and to prevent its recondensing upon the rubber structure, a stream of air was blown across the die plate. As a consequence, by the time the rubber had dropped on to conveyor 25, FIG. 1, the rubber temperature had decreased to 150 degrees F. and the moisture content of the rubber was 0.3%.

At 330 degrees F. the latent heat of water is 886.5 B.t.u.'s per pound. It may be calculated that if the rubber with its 9.1% moisture content were raised to 325 degrees F. and then permitted to cool to 150 degrees F., sufficient B.t.u.'s would thereby be furnished to cause the evaporation of the water in the system. As the amount of water in the system is increased, an increase in temperature of the system would be required to provide the B.t.u.'s necessary for the evaporation of the water. Similarly as the amount of water in the system is decreased, a lower temperature is required to cause the evaporation of the water.

It has been found that with some synthetic rubbers, for example some "1500 Series" styrene-butadiene copolymers and some polybutadienes, temperature slightly in excess of the calculated theoretical temperatures are sufficient to cause the evaporation of the water in the system when that amount of water is less than ten percent. More significantly it was found that most synthetic rubbers and natural rubbers require temperatures higher than the theoretically calculated temperature. For example, if natural rubber, under the conditions of the above example, were processed through the apparatus of this invention so that the temperature just ahead of the die plate was 330 degrees F. and the steam pressure of the water in the system would thereby be 103 p.s.i. absolute, (see Table I below) the rubber issuing from the die plate would merely tend to balloon or expand tangentially and longitudinally without any rupturing of the periphery of the rubber tube. Some of the water in dropping in pressure would evaporate within the rubber tube structure causing a decrease in the temperature of the system. A recondensation would occur so that within seconds of time the natural rubber would assume its natural shape with the major part of its original moisture content still trapped within the structure.

TABLE I

*Internal temperatures and pressures in one exemplification of dryer in accordance with this invention*

| Time in dryer, seconds | Temperature, °F. | Saturated steam pressure, pounds absolute | Internal mechanical pressure, pounds absolute |
|---|---|---|---|
| 0 | 150 | 3.7 | 14.7 |
| 9.5 | 200 | 11.5 | 140.0 |
| 10.0 | 210 | 14.1 | 160.0 |
| 15.0 | 247 | 28.3 | 390.0 |
| 20.0 | 275 | 45.4 | 650.0 |
| 25.0 | 302 | 69.0 | 875.0 |
| 30.0 | 330 | 103.0 | 1,015.0 |
| (*) | (*) | (*) | (*) |
| 30.1+ | 212 | 14.7 | 14.7 |

*Discharge.

For a matter of definition, it can be stated that among the polymeric materials comprised herein, different rubbers have different tensile strengths or different cohesive forces and that greater pressures are required to overcome these cohesive forces in some rubbers than in others. For example, it was found that certain of the "1700 Series" styrene-butadiene copolymers required steam pressures in the range of 150 to 240 p.s.i. (360 to 400 degrees F.) to overcome the cohesive force of the rubber so that the change in pressure of the water in the rubber as it issues from the die plate would be sufficient to expand and rupture the rubber structure, thus permitting the escape of the resultant steam. Natural rubber, as an example, requires steam pressures in the range of 250 to 400 p.s.i. (400–445 degrees F.). For convenience, Table II gives absolute steam pressures for different temperatures of saturated steam.

As a further example polyisoprene containing 16.1 percent of moisture has been dried by the methods and means of this invention at a rate of 4700 pounds per hour. In such operations with this synthetic rubber, temperatures in the range of 400 to 450 degrees F. are employed to dry this material. Pressures at the discharge end of the dryer vessel just ahead of the die plate 79 (FIG. 6A) of 2000 to 4000 p.s.i. have been experienced.

It may be calculated that when this rubber, containing 16.1 percent of moisture, is heated to 450 degrees F. and then permitted to cool by evaporation to 150 degrees F., an insufficient number of B.t.u.'s are provided to evaporate this amount of water. Stroboscopic pictures illustrate that a considerable amount of the water discharging with the rubber from the die openings of the apparatus of this invention was ejected from the water system in small droplet form. A stream of air was blown across the die plate in a direction away from conveyor 25 (FIG. 1). Because of the velocity and humidity condition of the air these small water droplets were removed from the system and finally absorbed in vapor form by the air. The B.t.u.'s however in the polyisoprene and the residual moisture leaving the die plate were sufficient to cause the evaporation of this residual moisture down to 0.16 percent.

TABLE II

*Saturated steam temperature and pressure table*

| Saturated steam temperature ° F.: | Saturated steam pressure pounds absolute |
|---|---|
| 300 | 67.01 |
| 330 | 103.00 |
| 350 | 134.62 |
| 400 | 247.25 |
| 450 | 422.61 |

In FIG. 13 the temperature and pressure profiles across the drying apparatus are shown in full line form, $T_1$, for a "Series 1000" butadiene-styrene copolymer at 4500 pounds per hour throughput rate.

The broken line, $T_2$, is a temperature profile of the same sized drying apparatus when processing polyisoprene under approximately the same conditions of retention time, or "residence time." The internal mechanical pressure in processing the polyisoprene was 3200 p.s.i. just ahead of the die plate. The pressure profile under the latter conditions is not shown in FIG. 13. It will be noted from FIGS. 12 and 13 that the three different polymers required three substantially different temperatures in order to arrive at dried polymers containing less than 0.5 percent moisture. In all cases the mechanical pressure within the drying apparatus was above the vapor pressure of the liquid. The temperature was raised from the inlet temperature of 150 degrees F. to the discharge temperature within less than 60 seconds and the temperatures of the rubber-water systems were increased progressively and rapidly to maximum temperatures at which point they were immediately discharged from the drying apparatus.

Since relatively elevated temperatures are required to accomplish the means of this invention, the time at temperature must be inordinately short to prevent the thermal decomposition of the polymers being dried. It has been found that the temperatures in the order of 300 degrees F. for 25 seconds or temperatures above 220 degrees F. for 30–60 seconds are sufficiently short so that polymer degradation does not occur.

It is important in practicing this invention that the polymer temperature be increased to a value wherein the B.t.u. content of the water-polymer system just before issuing from the die plate is sufficient to provide those B.t.u.'s required to evaporate the residual moisture in that system. It is a necessity, moreover, that the mechanical pressure imposed upon the system within the dryer of this invention be sufficiently high that the liquid in the system is maintained in the liquid form. This relationship for the above given example is shown in Table I above. It is further necessary that the temperature of the rubber-liquid system be raised to a value in excess of the theoretically calculated temperature value in order that sufficient vapor pressure is provided as the rubber-liquid system discharges from the die plate to overcome the cohesive force of the polymer being treated. Further, it is preferable that the polymer not be exposed to temperatures in excess of 220 degrees F. for more than 30–60 seconds, and not be exposed to temperatures of 300–450 degrees F. for more than 30–50 seconds.

Stroboscopic pictures have been taken to determine the character of the rubber and water discharging from the die plate of the dryer of this invention when processing a polybutadiene. The pictures demonstrate that the rubber flowing through the die holes of the die plate is expanded to 3–4 times the diameter of the die openings instantaneously upon discharging from the die plate. The pictures likewise show droplets of water which have been ejected and exploded from the rubber structure and give the appearance of rapid boiling or evaporation of water from the water spheres. The methods of this invention must be carried out so that the rubber leaving the die plate is not only expanded in structure but is literally exploded into a very porous structure so that some of the liquid contained therein is ejected from the solid rubber, and the residual liquid is caused to be evaporated by the B.t.u.'s in the mass.

In addition to deliquifying and drying of polymers, it is apparent that the violent mastication of polymers in passage through the apparatus of this invention permits the blending of additional components into the polymers during processing, or increases the degree of dispersion of accessory components previously added to the polymers.

Because of the relatively high overall heat transfer coefficient attainable with the apparatus of this invention, a ready means of product temperature control is thereby provided. It has been found, for example, in the processing of different polymers that 20–35% of the B.t.u.'s required to raise the temperature of the polymer and its retained liquid to proper temperatures for liquid evaporation may be provided from the steam jacket. As a consequence, if a synthetic rubber, for example a copolymer of butadiene and styrene is to be dried at a control temperature of 385 degrees F., a thermocouple 105 may be inserted in the die plate 79 (FIG. 8) of the apparatus, or through an opening adjacent to the die plate. Since the steam jacket of the apparatus is not in close heat-transfer contact with this die plate, the die plate reflects the temperature of the polymer itself. By means of a controller 106 shown only in outline in FIG. 8 the temperature of the polymer as sensed by the thermocouple will control the steam admission to the jacket of the apparatus. As a consequence, if the temperature tends to exceed 385 degrees F., the jacket pressure will automatically be reduced. If the temperature tends to fall below 385 degrees F., the jacket pressure can be increased.

As previously mentioned I have found that different polymers require the use of different sizes and shapes of die openings in the discharge plate 79 of the apparatus. These openings, however, are normally in the range of ¼" to ⅟₃₂" in diameter. It is likewise preferable that the core thickness of the die openings be less than the diameter of the die openings. It has also been found that there is an optimum capacity per die opening of any particular size and core thickness. However, there is a range of capacity on both sides of the optimum, which permits efficient operation of the apparatus. With one specific polymer, 170 pounds per hour per ¼" diameter opening is found to be optimum. However, capacities of 25% plus and minus this optimum value are permissible. As a consequence a suitable die opening for many series of polymers may be selected and a suitable number of die openings for the capacity anticipated may be predetermined. By thus selecting the proper open area and number of dies, the horsepower input for the drying apparatus may be held to a minimum and the maximum utility and B.t.u. input may be derived from the jacket steam.

In addition to circular die openings, other forms of die openings may be employed. A circular die opening does give to the extruded polymer the largest outside area per unit of polymer being extruded. In some instances, however, it may be preferable to employ a slotted die opening wherein a number of slots, for example ⅛" x 1", to ⅟₆₄" x 1", or a single slot of greater length is employed. Even though the slotted die opening furnishes a lesser area per unit of polymer extruded than a circular opening, the slotted opening does permit a thinner cross sectional area of extruded polymer.

This invention is not restricted to the specific apparatus shown in the accompanying drawings. For example the deliquifying apparatus of FIGS. 2 and 2A may be an integral part of the drying apparatus, FIGS 6 and 6A. In the drying operation, however, the temperature of the polymer must be continuously and rapidly raised to a selected final temperature under conditions such that the liquid contained therein during compression in the drying unit should be maintained in a substantially liquid form and not be permitted to escape from the polymer until the instant of final discharge of the polymer from the die exit openings of the drying unit.

As another example of the practice of this invention, a polyethylene polymer slurry in hexane was deliquified on a vibrating screen to approximately 60% hexane and then fed to hopper 21, FIG. 1 of the deliquifying apparatus of this invention at a rate of 270 pounds per hour dry weight basis. The polyethylene was deliquified to 14% hexane. It was continuously dropped into hopper 24, FIG. 1, of the drying apparatus of this invention. The temperature controllers of the drying apparatus were set to furnish a temperature of 370 degrees F. on the polyethylene at the die plate of the apparatus. At this temperature the polyethylene continuously flowed from the die openings of the die plate in a relatively fluid form and expanded to porous cylinders of approximately six times the area of the die openings. The evaporative cooling effect of the evaporating hexane reduced the temperature of the polyethylene so that within a matter of 3-5 seconds it had assumed the relatively rigid form of polyethylene at room temperature, and contained no traces of hexane.

Summarizing the novel aspects of the present invention, in substantially completely removing all traces of liquid from a liquid-bearing polymeric material, I have found certain advantages of the invention to be attained by advancing the material through an elongated enclosure to a discharge point, simultaneously applying gradually increasing mechanical pressure to the advancing material and causing progressive increase in the temperature of the material, and finally permitting sudden escape of the material to a zone of highest pressure adjacent and discharge point to a zone of greatly reduced temperature and pressure ouside the enclosure, the temperature within the enclosure being maintained in excess of 212 degrees F. for not more than sixty seconds, and the mechanical pressure on the material within the enclosure being always in excess of the vapor pressure of the liquid whereby to maintain substantially all of the liquid in the liquid phase until the material is discharge from the enclosure.

In a further novel aspect of the invention, as the material approaches the discharge point I cause the temperature within the enclosure to rise progressively within a range between 200 degrees F. to 450 degree F., within an elapsed time of between about ten seconds and sixty seconds. Actually, in the final three-fifths of the length of the enclosure the temperature rises from about 250 degrees F. to about 450 degrees F. in a time period of less than thirty-five seconds.

In one exemplification of the invention, in the final three-fifths of the length of the drying enclosure, the temperature is progressively raised within a range from about 250 degrees F. to 450 degrees F. in less than thirty-five seconds as the material approaches and is ejected from the discharge apertures.

In a further exemplification the temperature in the final half of the heating range is raised progressively from about 200 degrees F. to 275 degrees F. in about twenty seconds.

In another exemplification the temperature in the final half of the heating period is raised progressively in the range between about 275 degrees F. and 375 degrees F. in about twenty seconds.

It may be determined from the temperature profiles, FIGS. 12 and 13, that the rate of temperature increase in the final half of the length of the heating periods is in the range of three to seven degrees, Fahrenheit, per second.

It may further be emphasized that within a final fifty-degree temperature increase range, just prior to material discharge, the elapsed time in most instances in not more than ten seconds.

Normally, within the usual shaft r.p.m. rate in the drying enclosure, the material traverses the complete length of the enclosure in from thirty to sixty seconds. The usual pressure range is of course always in excess of the vapor pressure range at the existing temperature at any point in the length of the enclosure, and may range between 100 pounds per square inch and 4000 pounds per square inch, although it usually does not exceed 3000 pounds per square inch.

So as to be assured that the polymer remains undamaged, we prefer that the time the material is maintained in the higher temperature ranges is very short indeed, for example not more than twenty to forty seconds above 220 degrees F., and in some embodiments not more than five to ten seconds above 300 degrees F. Actually, as shown by the temperature profile curve of the FIG. 12 example, the time the material remained "in residence" above 300 degrees F. was only about five seconds.

Prior art for the drying of polymeric materials such as Vickers United States Patent No. 2,833,750 describes only isothermal systems wherein a polymeric material containing a liquid is increased in temperature to a certain degree. The polymeric material and liquid are then retained in essentially a constant temperature (isothermal) zone under mechanical mastication so that new surfaces of the polymer are exposed for the escape of the liquid contained within the polymer structure. At the end of this indefinite period of time of substantially constant temperature isothermal drying, the polymer is compacted and extruded through a die such that no cooling of the polymer below the temperature of the isothermal drying is brought about, in fact its temperature is increased. The prior art emphasizes, and indeed, is based upon the fact that a liquid in vapor form cannot escape from the polymers under consideration without mechanical mastication during a substantially constant temperature drying period. The mechanical mastication was necessary because such polymers have relatively high tensile strength and elastic limits which define the modulus of the polymer and which must be overcome in order for vapor to escape from the polymer.

The B.t.u.'s required to vaporize an amount of liquid in a polymer can be calculated. Even if the required amount of this energy calculated in terms of B.t.u.'s were calculated, the prior art had no suggestion as to how to cause the liquid converted into vapor to escape from the polymer except by mechanical mastication which would open new surfaces and thereby permit vapor to escape. This of necessity required a constant temperature isothermal system of drying.

It was discovered, in accordance with the present invention, that if certain forms of internal energy in predetermined amounts were built up in the polymer liquid system, these energies in themselves could overcome the tensile strength and elastic limit of the polymer to cause vapor to escape almost instantaneously from the polymer. It was discovered that in addition to the energy in the form of B.t.u.'s, to evaporate liquid from a polymer liquid system, an internal energy in the form of liquid pressure was required to strain the polymer beyond its tensile strength upon discharge from the apparatus of this invention and an internal energy in the form of relative potential vapor volume was required to exceed the elastic limit of the polymer. By the use of these two latter internal energies coupled with a sufficient sensible heat in the form of B.t.u.'s, mechanical mastication at a constant temperature and the continual exposure of fresh polymer surfaces was not required for the drying of the polymers under consideration. It was discovered that by building up the three enumerated internal energies within the system, continuously and rapidly, the polymer liquid system could be discharged to the atmosphere with the attendant immediate explosion of the polymer surfaces by simultaneously exceeding the tensile strength and elastic limit of the polymer. These internal energies not only convert the liquid to vapor form, but cause the vapor to escape from the polymer yielding a dry product.

As an example, cis-4-polybutadiene was dewatered and dried in apparatus as shown in FIG. 1. The polymer was continuously dewatered to 9% moisture and then continuously processed in the dryer, FIG. 23. Initially a die plate temperature (No. 79, FIG. 6A) of 260° F. was established. After conditions had come to equilibrium, data and samples were taken. The die plate temperature was then increased to 275° F. and again equilibrium conditions were established. The die plate temperature was increased similarly up to a final temperature of 385° F. as shown in Table III. From Table III, it will be observed that when the temperature at the die plate and, therefore, the temperature of the polybutadiene and water were at a temperature of 335° F., there were 2.7% more B.t.u's in sensible heat in the polymer and water than required to dry the polymer down to 5/10% moisture. Not until the required amount of sensible heat was available in the system could the system be dried to this moisture content. At these conditions the steam pressure of the water in the rubber, just before discharge from the apparatus was 89 p.s.i., and the potential volume of steam vapor was 220 cubic feed per cubic foot of polymer. It will be observed from the subsequent run in Table III that by increasing the steam pressure within the polymer-water system at the die plate, more moisture was removed from the system upon discharge even though less sensible heat was available than in the previous run at lower steam pressures.

A polyethylene was also processed in a similar manner. The data from the five different runs are summarized in Table IV. It will be observed from Table IV that not until the internal steam pressure of the water at the die plate had reached approximately 280 p.s.i. could the volatiles be flashed from the polymer-liquid system even though the system had a large excess of available heat for disolventizing in all cases.

The polyethylene which is thermo plastic was processed in apparatus as shown in FIG. 1, employing one-fourth inch dies in the die plate. The hot polyethylene upon issuing from the die plate formed a tube of about one and one-half inches in diameter. There was an insufficient amount of vapor pressure, however, to overcome the elastic limit of the polyethylene so that upon the rapid cooling of the plastic tube, liquid recondensed within the tube. A dry product, therefore, was not produced. By increasing the pressure above about 250 pounds per square inch sufficient energy was available to stretch the polymer beyond its elastic limit and the polyethylene was dried to less than 5/10% moisture.

The amount of B.t.u.'s as sensible heat required to evaporate a given amount of liquid from a polymeric material can be calculated. However, no way was known to cause the liquid as vapor to escape from the system. It was discovered that an additional internal energy of the polymer-liquid system was required in the form of superheated vapor pressure within the system in order to strain the polymer sufficiently to overcome its tensile strength and thus permit the vapor to escape. Not until this condition of pressure was attained, could the liquid as vapor force its way through the polymer structure.

Polyisoprene was processed in apparatus as shown in FIG. 1, under conditions that the moisture content of the dewatered rubber upon entering dryer 23 was in the range of 3 to 4%. At these low moisture contents and at 400 to 450° F., the polymer issuing from the die plate 79 was about 5/10% moisture. By processing polyisoprene in such a manner that the moisture content of the polymer entering dryer 23 was above 6%, then dry polymer was readily obtained. It was discovered that a third source of energy must also be available in order to dry polymeric materials according to the methods and means of this invention. This third energy is the potential vapor volume of the liquid with the polymeric material just after the die plate. In the case of rubber when the potential vapor volume is in the range of 140 to 150 volumes of vapor per volume of polymer, there is an insufficient relative volume to stress the polymer beyond its elastic limit. Another series of tests were made with a high tensile strength rubber, not polyisoprene. It will be observed from Table V that even at 360° F. with 25.6% more available B.t.u's than required and about 150 p.s.i. of steam pressure, the polymer upon discharge from the apparatus was still about 5/10% moisture. Not until the volume of steam per volume of polymer has exceeded 200 volumes could substantially all of the moisture be removed from the system.

The data collected while processing polyethylene and reported in Table IV indicate that vapor volumes in the neighborhood of 35 to 55 cubic feet per cubic foot of polymer are sufficient to produce dry material provided the requirements of vapor pressure and heat are satisfied. Of course, the heat required for drying any system will depend upon the thermodynamic properties of the volatiles and polymers within the systems. Similarly, the vapor volume per volume of polymer and the vapor pressure required to produce dried polymer will vary with the physical properties; such as tensile strength and elasticity, of the polymer.

TABLE III

*Polybutadiene at 9% $H_2O$*

| Die plate temp., ° F. | $H_2O$, percent in product | Product temp., ° F. | B.t.u. required to reach 0.5% $H_2O$ | Total B.t.u. available | Steam pressure, p.s.i. | Vol. steam per vol. rubber |
|---|---|---|---|---|---|---|
| 260 | 1.53 | 140 | 86.3 | 71.9 | 21.4 | 202 |
| 275 | 1.50 | 152 | 85.4 | 73.7 | 31.4 | 214 |
| 300 | 0.60 | 165 | 83.6 | 80.8 | 52.0 | 210 |
| 305 | 0.60 | 170 | 83.3 | 80.9 | 58.1 | 212 |
| 335 | 0.50 | 195 | 81.5 | 83.7 | 89.0 | 220 |
| 340 | 0.40 | 205 | 80.8 | 81.7 | 104.0 | 224 |
| 350 | 0.30 | 208 | 80.0 | 86.1 | 120.0 | 224 |
| 385 | 0.20 | 180 | 77.2 | 126.1 | 193.0 | 218 |

TABLE IV
Plastic

| Die plate temp., °F. | Solvent, percent in feed | Solvent, percent in product | Product temp., °F. | B.t.u. required to reach 0.5% solvent | Total B.t.u. available | Solvent vapor pressure, p.s.i. | Vol. vapor per vol. rubber |
|---|---|---|---|---|---|---|---|
| 325 | 12.8 | 3.2 | 190 | 16.9 | 88.8 | 130 | 53.5 |
| 350 | 10.5 | 1.3 | 200 | 12.9 | 86.3 | 155 | 43.4 |
| 350 | 8.5 | 0.9 | 190 | 10.2 | 90.9 | 155 | 33.8 |
| 375 | 10.0 | 0.3 | 200 | 11.7 | 100.3 | 285 | 40.8 |
| 390 | 10.3 | 0.3 | 220 | 11.7 | 98.5 | 365 | 44.2 |

TABLE V
High tensile rubber

| Die plate temp., °F. | $H_2O$, percent in feed | $H_2O$, percent in product | Product temp., °F. | B.t.u. required to reach 0.5% $H_2O$ | Total B.t.u. available | Steam pressure, p.s.i. | Vol. steam per vol. rubber |
|---|---|---|---|---|---|---|---|
| 310 | 15.5 | 3.5 | 200 | 159 | 69.7 | 63.7 | 315 |
| 315 | 8.4 | 2.1 | 190 | 77 | 70.5 | 69.5 | 153 |
| 360 | 8.5 | 1.0 | 200 | 75.2 | 94.5 | 139.0 | 187 |
| 370 | 10.0 | 0.5 | 200 | 89.8 | 105.3 | 169.3 | 243 |

The prior art of drying elastomers by mechanical means relied upon isothermal drying because it was not known how to establish internal energy within a polymer-liquid system so that these energies in themselves would cause the escape of the liquid contained therein. Prior art mechanical dryers maintained the polymer at drying temperatures under conditions of polymer mastication so that new surfaces of the polymer would be exposed for the escape of the liquid contained within the polymer structure. Mechanical mastication, therefore, was employed in the prior art to overcome the tensile strength and elastic limit of the polymers processed. It has been discovered that these physical characteristics of elastomers may be exceeded by the internal energy of an elastomer-liquid system, such internal energy consisting of three specific forms:

(1) Energy in the form of sensible heat which must be at least equal to the B.t.u.'s required to evaporate the liquid down to any given level.

(2) Internal energy in the form of liquid pressure just before discharge to the atmosphere of such a degree to strain the elastomer beyond its tensile strength.

(3) Internal energy in the form of relative potential volume of vapor compared to the volume of polymer that will exceed the limit of elasticity of the polymer.

Under these conditions an adiabatic system of drying may be employed as opposed to the isothermal system described by prior art mechanical methods.

The heat energy of the liquid and polymer at the die plate of the apparatus of this invention which is suddenly released into the atmosphere has a considerable force. The liquid greatly expands in volume and the heat energy is converted to energy causing a violent explosion. The degree of this explosion depends upon the pressure, temperature, nature and volume of the liquid polymer system at the time of discharge from the die plate. To illustrate the magnitude of this release of heat energy, it is calculated that the energy released at the die plate in a commercial unit, as illustrated in FIG. 1, No. 23, is equivalent to the detonation of one-tenth pound of TNT every second.

What is claimed is:

1. A method of substantially removing all liquid from a liquid-bearing polymeric material containing a substantial amount of liquid, said method comprising (1) advancing the material through an elongated enclosure to a discharge point, (2) gradually increasing mechanical pressure on the advancing material and simultaneously progressively increasing the temperature of the material-liquid system such that the sensible heat within the material-liquid system upon flash cooling is sufficient in itself to evaporate the liquid, expand the material and rupture the surface thereof, (3) establishing a mechanical pressure on the material-liquid system to prevent any substantial loss of liquid in vapor form, (4) thereafter maintaining the mechanical pressure on the material-liquid system throughout a sufficient length of the enclosure above the vapor pressure of the liquid at the progressively increasing temperatures of the system to keep the liquid of the material of the material-liquid system in the form of a liquid in said length of the enclosure, and (5) immediately discharging the material-liquid system to a zone outside of said enclosure, thereby instantaneously releasing the vapor pressure of the liquid therein to explosively vaporize said liquid, thereby expanding the polymeric material and rupturing the surfaces thereof for the spontaneous escape of substantially all of the liquid therefrom by utilizing the sensible heat within the cooling system.

2. A method of substantially completely removing all traces of liquid from a liquid-bearing polymeric material containing a substantial amount of liquid, said method comprising (1) advancing the material through an elongated enclosure to a discharge point, the period of time of such advance of the polymer-liquid material through said enclosure being not more than about sixty seconds, (2) progressively increasing the temperature of the material-liquid system such that the sensible heat within the material-liquid system upon cooling is sufficient in itself to evaporate the liquid, expand the material and rupture the surfaces thereof, (3) establishing a mechanical pressure on the material-liquid system to prevent any substantial loss of liquid in vapor form, (4) thereafter maintaining the mechanical pressure in the material-liquid system throughout a sufficient length of the enclosure above the vapor pressure of the liquid at the progressively increasing temperatures of the system to keep the liquid of the material-liquid system in the form of a liquid in said length of the enclosure, and (5) immediately discharging the material-liquid system to a zone outside of said enclosure, thereby instantaneously releasing the vapor pressure of the liquid therein to explosively vaporize said liquid, thereby expanding the polymeric material and rupturing the surfaces thereof for the spontaneous escape of substantially all of the liquid therefrom by utilizing the sensible heat within the cooling system.

3. A method comprising the steps of (1) heating within an elongated enclosure a solid polymeric material containing a substantial amount of a liquid, (2) compacting said material to progressively increase the pressure on said material to keep the pressure greater than the vapor pressure of the liquid, (3) heating the material to increase the temperature to build up the sensible heat of the liquid-material system sufficiently to evaporate the liquid and to overcome the cohesive force of the material to expand the same and rupture the surfaces thereof, (4) establishing a mechanical pressure on the material-liquid system to prevent any substantial loss of liquid in vapor form, thereafter maintaining the mechanical pressure in the material-liquid system throughout a sufficient length of the enclosure above the vapor pressure of the liquid at the progressively increasing temperatures of the system to keep the liquid of the material of the material-liquid system in the form if a liquid in said length of the enclosure, and (5) explosively releasing the vapor to expand the material to provide a porous structure therefor, said explosive releasing of the vapor being caused by dropping the pressure of the liquid to approximately atmospheric pressure and thereby lowering the temperature of the material.

4. A method of removing liquid from a solid polymeric material containing a substantial amount of liquid to provide a dry material having less than about 0.5% liquid, the method comprising (1) advancing the material through an elongated enclosure to a discharge point, (2) building up the sensible heat in said material by increasing the temperature thereof and increasing pressure thereon sufficiently to evaporate said liquid and to expand and rupture the structure of the material by overcoming the cohesive force thereof, (3) establishing a mechanical pressure on the material-liquid system to prevent any substantial loss of liquid in vapor form, (4) thereafter maintaining the mechanical pressure on the material-liquid system throughout a sufficient length of the enclosure above the vapor pressure of the liquid at the progressively increasing temperatures of the system to keep the liquid of the material of the material-liquid system in the form of a liquid in said length of the enclosure, and (5) explosively releasing the liquid as a vapor from the material by forcing it from the discharge point to thereby provide a dried expanded and porous material.

5. A method of substantially completely removing all traces of liquid from a liquid-bearing polymeric material containing a substantial amount of liquid to provide a material having a moisture content of less than 0.5% by weight, said method comprising (1) advancing the material through an elongated enclosure to a discharge point, (2) simultaneously applying gradually increasing mechanical pressure to the advancing material and causing progressive increase in the temperature of the material to a temperature that is not over about 212° F. for more than about 60 seconds to build up the sensible heat if the liquid-material system sufficiently to evaporate the liquid and to overcome the cohesive force of the material to expand the same and rupture the surfaces thereof, (3) establishing the mechanical pressure on the material-liquid system to prevent any substantial loss of liquid in vapor form, (4) thereafter maintaining the mechanical pressure on the material-liquid system throughout a sufficient length of the enclosure above the vapor pressure of the liquid at the progressively increasing temperatures of the system to keep the liquid of the material in the form of a liquid in said length of the enclosure, and (5) immediately discharging the material-liquid system to a zone outside of said enclosure, thereby instantaneously releasing the vapor pressure of the liquid therein to explosively vaporize said liquid, thereby expanding the polymeric material and rupturing the surfaces thereof for the spontaneous escape of substantially all of the liquid therefrom by utilizing the sensible heat within the cooling system.

6. A method of substantially completely removing all traces of liquid from a liquid-bearing, polymeric material containing a substantial amount of liquid, said method comprising (1) advancing the material through an elongated barrel to a discharge point, (2) heating said material to progressively increase the temperature in the final half of the heating period within a range of from about 200° F. to about 275° F. in about 20 seconds to build up the sensible heat of the liquid-material system sufficiently to evaporate the liquid and to expand and rupture the structure of the material by overcoming the cohesive force thereof, (3) establishing a mechanical pressure on the material-liquid system to prevent any substantial loss of liquid in vapor form, (4) thereafter maintaining the mechanical pressure of a material-liquid system throughout a sufficient length of the enclosure above the vapor pressure of the liquid at the progressively increasing temperatures of the system to keep the liquid of the material in the form of a liquid in said length of the enclosure, and (5) immediately discharging the material-liquid system to a zone outside of said enclosure, thereby instantaneously releasing the vapor pressure of the liquid therein to explosively vaporize said liquid, thereby expanding the polymeric material and rupturing the surfaces thereof for the spontaneous escape of substantially all of the liquid therefrom by utilizing the sensible heat within the cooling system.

7. A method of substantially completely removing all traces of liquid from a liquid-bearing, elastomeric polymeric material containing a substantial amount of liquid, said method comprising (1) advancing the material through an elongated enclosure to a discharge point, (2) gradually increasing the pressure on the material and the temperature thereof to build up the sensible heat of the liquid-material system sufficiently to evaporate the liquid and to overcome the cohesive force of the material to thus expand the same and rupture the surfaces thereof, (3) establishing a mechanical pressure on the material-liquid system to prevent any substantial loss of liquid in vapor form, (4) maintaining the mechanical pressure on the material-liquid system throughout a sufficient length of the enclosure above the vapor pressure of the liquid at the progresssively increasing temperatures of the system to keep the liquid of the material of the material-liquid system in the form of a liquid in said length of the enclosure, and (5) immediately discharging the material-liquid system to a zone outside of said enclosure, thereby instantaneously releasing the vapor pressure of the liquid therein to explosively vaporize said liquid, thereby expanding the polymeric material and rupturing the surfaces thereof for the spontaneous escape of substantially all of the liquid therefrom by utilizing the sensible heat within the cooling system.

8. A method of substantially completely removing all traces of liquid from a liquid-bearing, polymeric material containing a substantial amount of liquid to provide a material having less than about 0.5% moisture, said method comprising (1) advancing the material through an elongated enclosure to a discharge point, (2) simultaneously applying gradually increasing mechanical pressure to the advancing material and heating the material to provide a progressive increase in the temperature of the material, (3) progressively raising the temperature in the final half of the length of the heating period range from about 200 degrees F. to about 275 degrees F. in about twenty seconds, (4) maintaining a temperature within fifty degrees, Fahrenheit, of the final discharge temperature for not more than ten seconds, (5) maintaining the mechanical pressure on the material within the enclosure at a value always in excess of the vapor pressure of the liquid to maintain substantially all of the liquid in the liquid phase until the material is discharged, and (6) immediately discharging the material-liquid system to a zone outsde of said enclosure, thereby instantaneously releasing the vapor pressure of the liquid therein to explosively vaporize said liquid, thereby expanding the polymeric material and rupturing the surfaces thereof for the spontaneous escape of substantially all of the liquid therefrom by utilizing the sensible heat within the cooling system.

9. A method of substantially completely removing all traces of water from a water-bearing, polymeric material having about 5 to 20% by weight of water, said method comprising (1) advancing the material through an elongated enclosure to a discharge point, (2) simultaneously applying gradually increasing mechanical pressure to the advancing material and causing progressive increase in the temperature of the material to build up the sensible heat of the material-water system sufficiently to evaporate the water and overcome the cohesive force of the material to thus expand the same and rupture the surfaces thereof, (3) maintaining the temperature within the enclosure above the pressure boiling point of water for less than about sixty seconds, (4) establishing a mechanical pressure on the material-water system to prevent any substantial loss of water in vapor form, (5) thereafter maintaining the mechanical pressure on the material-water system throughout a sufficient length of the enclosure above the vajor pressure of water at the progressively increasing temperatures of the system to keep the water in the form of a liquid in said length of the enclosure, and (6) immediately discharging the material-water system to a zone outside of said enclosure, thereby instantaneously releasing the vapor pressure of the water therein to explosively vaporize said water, thereby expanding the polymeric material and rupturing the surfaces thereof for the spontaneous escape of substantially all of the liquid therefrom by utilizing the sensible heat within the cooling system.

10. A method of substantially completely removing all traces of liquid from a liquid-bearing elastomeric polymeric material containing a substantial amount of liquid, said method comprising advancing the material through an elongated enclosure to a discharge point, progressively heating the material to increase the temperature thereof with a range of about 200° F. to 450° F. as the material approaches the discharge point to build up the sensible heat thereof sufficiently for vaporizing the liquid for expanding and rupturing the surfaces of said material, establishing a mechanical pressure of about 100 pounds per square inch to 3,000 pounds per square inch within a period of not greater than about 60 seconds on the material-liquid system to prevent any substantial loss of liquid in vapor form, maintaining the mechanical pressure on the material-liquid system throughout a sufficient length of the enclosure above the vapor pressure of the liquid at the progressively increasing temperatures of the system to keep the liquid in the form of a liquid in said length of the enclosure, and explosively releasing the liquid as a vapor from the material by instantaneously discharging the material to a zone of greatly reduced temperature and pressure outside the enclosure.

11. A method as defined in claim 10 in which the material is exposed to its maximum temperature between 300° F. and 400° F. for not more than 5 to 10 seconds.

12. A method as defined in claim 10 in which the material is exposed to temperatures above 220° F. for not more than about 40 seconds.

13. A method of substantially completely removing all traces of liquid from a styrene-butadiene copolymeric material containing a substantial amount of liquid, said method comprising advancing the material through an elongated enclosure to a discharge point, simultaneously applying gradually increasing mechanical pressure to the advancing material to raise the pressure thereon to about 1015 pounds per square inch at the discharge point and progressively increasing the temperature within the enclosure to about 330° F. for not more than sixty seconds to thereby build up the sensible heat of the system sufficient to vaporlze the liquid and to expand the material and rupture the surfaces thereof, establishing a mechanical pressure on the material-liquid system to prevent any substantial loss of liquid in vapor form, maintaining the mechanical pressure on the material-liquid system throughout a sufficient length of the enclosure above the vapor pressure of the liquid at progressively increasing temperatures of the system to keep the liquid of the material in the form of a liquid in said length of the enclosure, and immediately discharging the material of the material-liquid system to a zone outside of said enclosure, thereby instantaneously releasing the vapor pressure of the liquid therein to explosively vaporize said liquid, thereby expanding the polymeric material and rupturing the surfaces thereof for the spontaneous escape of substantially all of the liquid therefrom by utilizing the sensible heat within the cooling system.

14. A method of removing water from a wet styrene-butadiene copolymer containing a substantial amount of water to provide a dry copolymer containing not substantially greater than about 0.5% by weight of water, the method comprising advancing the wet copolymer along an elongated enclosure toward a discharge point so that said copolymer reaches the discharge point in not more than about 30 seconds, gradually increasing mechanical pressure on the copolymer within the enclosure to about 1015 pounds p.s.i. absolute, gradually increasing the temperature of the wet copolymer within the enclosure to at least about 330° F. to build up the sensible heat of the wet copolymer sufficient upon cooling to vaporize the water and overcome the cohesive force of the copolymer so as to expand and rupture its surface, establishing a mechanical pressure on the water-copolymer system to prevent any substantial loss of liquid in vapor form, thereafter maintaining the mechanical pressure on the water-polymer system throughout a sufficient length of the enclosure above the vapor pressure of the liquid at the progressively increasing temperatures of the system to keep the water of the copolymer in the form of water in said length of the enclosure, and immediately discharging the water-copolymer system to a zone outside of said enclosure, thereby instantaneously releasing the vapor pressure of the water therein to explosively vaporize said water, thereby expanding the copolymer and rupturing the surfaces thereof for the spontaneous escape of substantially all of the water therefrom by utilizing the sensible heat within the cooling system.

15. A method of removing liquid from wet polyisoprene containing a substantial amount of liquid to provide a dry polyisoprene having a liquid content not substantially greater than about 0.5%, the method comprising (1) advancing polyisoprene along an elongated enclosure toward a discharge point so that the full length thereof is travelled in less than about sixty seconds, (2) gradually increasing the temperature of the polyisoprene to about 400 to 450° F. so that the sensible heat within the polyisoprene-liquid system is sufficient in itself to evaporate the liquid, expand the polyisoprene, and rupture the surfaces thereof, (3) establishing a mechanical pressure on the polyisoprene-liquid system to provide a pressure of about 2000 to 4000 p.s.i. absolute just ahead of the discharge point to prevent any substantial loss of liquid in vapor form, (4) thereafter maintaining the mechanical pressure in the material-liquid system throughout a sufficient length of the enclosure above the vapor pressure of the liquid at the progressively increasing temperatures of the system to keep the liquid of the material of the material-liquid system in the form of a liquid in said length of the enclosure, and (5) immediately discharging the polyisoprene-liquid system to a zone outside of said enclosure, thereby instantaneously releasing the vapor pressure of the liquid therein to explosively vaporize said liquid, thereby expanding the polymeric material and rupturing the surfaces thereof for the spontaneous escape of substantially all of the liquid therefrom by utilizing the sensible heat within the cooling system.

16. A method of removing liquid from wet polyisoprene containing a substantial amount of liquid to provide dry polyisoprene having a liquid content not substantially greater than about 0.5%, the method comprising (1) advancing polyisoprene along an elongated enclosure toward a discharge point so that the full length thereof is travelled in less than about forty-five seconds, (2) gradually increasing mechanical pressure on the polyisoprene to provide a pressure of about 900 p.s.i. absolute just ahead of the discharge point, (3) gradually increasing the temperature of the polyisoprene to about 450° F. to build up the sensible heat sufficient to vaporize the liquid, expand the polyisoprene and rupture its structure, (4) establishing a mechanical pressure on the material-liquid system to prevent any substantial loss of liquid in vapor form, (5) maintaining the mechanical pressure on the polyisoprene-liquid system throughout a sufficient length of the enclosure above the vapor pressure of the liquid at the progressively increasing temperatures of the system to keep the liquid of the polyisoprene in the form of a liquid in said length of the enclosure, and (6) explosively releasing the liquid from the polyisoprene by forcing it from the enclosure through the discharge point to thereby expand the polyisoprene and provide a dry expanded porous material.

17. A method of removing liquid from wet elastomeric styrene-butadiene copolymer material containing a substantial amount of liquid to provide a dry material having a liquid content not substantially greater than about 0.5%, the method comprising (1) advancing the material along an elongated enclosure toward a discharge point so that the full length thereof is travelled in about forty-five seconds, (2) gradually increasing the temperature of the material to about 375° F. to build up the sensible heat sufficient to vaporize the liquid and expand the material and rupture its structure, (3) establishing a mechanical pressure of about 600 p.s.i. absolute just ahead of the discharge point on the material-liquid system to prevent a substantial loss of liquid in vapor form, (4) thereafter maintaining the mechanical pressure on the material-liquid system throughout a sufficient length of the enclosure above the vapor pressure of the liquid at the progressively increasing temperatures of the system to keep the liquid of the material of the material-liquid system in the form of a liquid in said length of the enclosure, and (5) immediately discharging the material-liquid system to a zone outside of said enclosure, thereby instantaneously releasing the vapor pressure of the liquid therein to explosively vaporize said liquid, thereby expanding the polymeric material and rupturing the surfaces thereof for the spontaneous escape of substantially all of the liquid therefrom by utilizing the sensible heat within the cooling system.

References Cited by the Examiner

UNITED STATES PATENTS 2,833,750   3/1958   Vickers _____ 260—85.3
3,078,512   2/1963   De Haven _____ 18—2

WILLIAM F. O'DEA, *Primary Examiner.*

JOHN J. CAMBY, *Examiner.*